US008807892B2

(12) United States Patent
Spencer et al.

(10) Patent No.: US 8,807,892 B2
(45) Date of Patent: Aug. 19, 2014

(54) TRANSPORT TANK CRADLE ASSEMBLY

(75) Inventors: Brian E. Spencer, Sacramento, CA (US); Zachary B. Spencer, Sacramento, CA (US); Travis Balaski, Calgary (CA)

(73) Assignee: Ferus Inc., Calgary (CA)

( * ) Notice: Subject to any disclaimer, the term of this patent is extended or adjusted under 35 U.S.C. 154(b) by 0 days.

(21) Appl. No.: 13/811,624

(22) PCT Filed: Jul. 29, 2011

(86) PCT No.: PCT/US2011/045935
§ 371 (c)(1),
(2), (4) Date: Jan. 22, 2013

(87) PCT Pub. No.: WO2012/016164
PCT Pub. Date: Feb. 2, 2012

(65) Prior Publication Data
US 2013/0121781 A1    May 16, 2013

Related U.S. Application Data

(63) Continuation of application No. 61/369,309, filed on Jul. 30, 2010.

(51) Int. Cl.
*B60P 3/22*    (2006.01)
(52) U.S. Cl.
USPC .......................................................... 410/68
(58) Field of Classification Search
USPC ............ 410/68, 97, 106, 120; 248/49, 65, 72; 220/1.5, 562, DIG. 24; 280/830, 838, 280/839; 105/226, 228, 358, 360, 362
See application file for complete search history.

(56) References Cited

U.S. PATENT DOCUMENTS

| | | | |
|---|---|---|---|
| 898,177 | A | 9/1908 | Blest |
| 1,341,216 | A | 5/1920 | Kramer |
| 1,577,817 | A | 3/1926 | Spence |
| 1,791,588 | A | 2/1931 | Vogel |
| 2,074,523 | A | 11/1934 | Thwaits |
| 2,792,231 | A | 5/1957 | Compton |
| 3,626,867 | A | 12/1971 | Becker |

FOREIGN PATENT DOCUMENTS

| | | |
|---|---|---|
| WO | WO 2012/016163 A2 | 2/2012 |
| WO | WO 2012/161671 A1 | 2/2012 |

*Primary Examiner* — H Gutman
(74) *Attorney, Agent, or Firm* — Bennett Jones LLP

(57) ABSTRACT

A transport tank assembly for mounting to a truck has a composite tank body having an inner side and an outer side, and at least one cradle assembly connected to the outer side of the tank body. Each cradle assembly has a cradle having an inner side and an outer side, and at least one band of composite material disposed over the outer side of the cradle and at least a portion of the outer side of the tank. A length of the band of composite material is greater than a length of the cradle. The band of composite material connects the cradle to the tank body. The cradle and the at least one band in a generally lateral direction of the tank body.

37 Claims, 25 Drawing Sheets

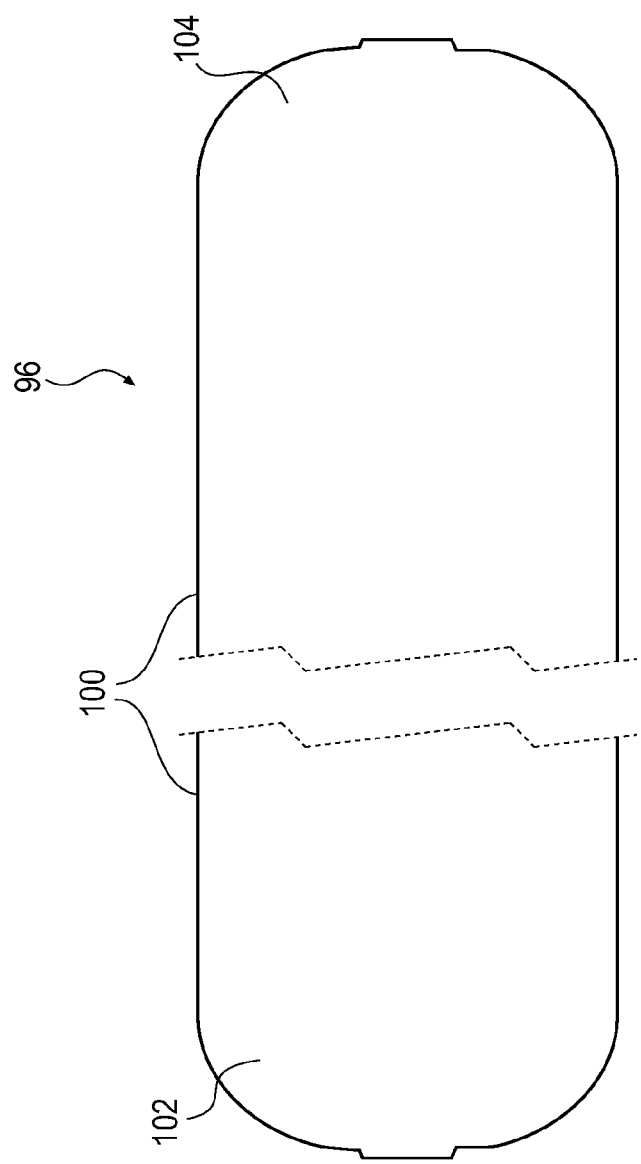
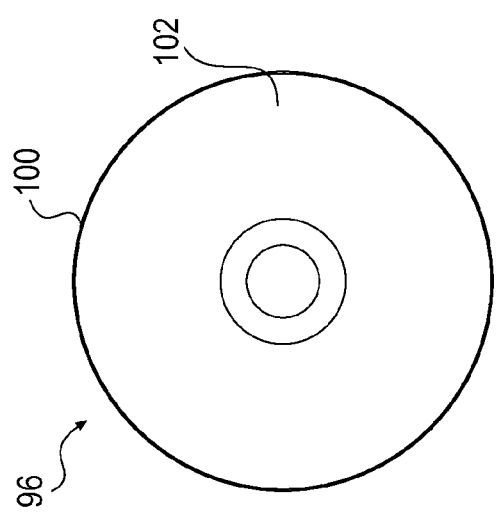

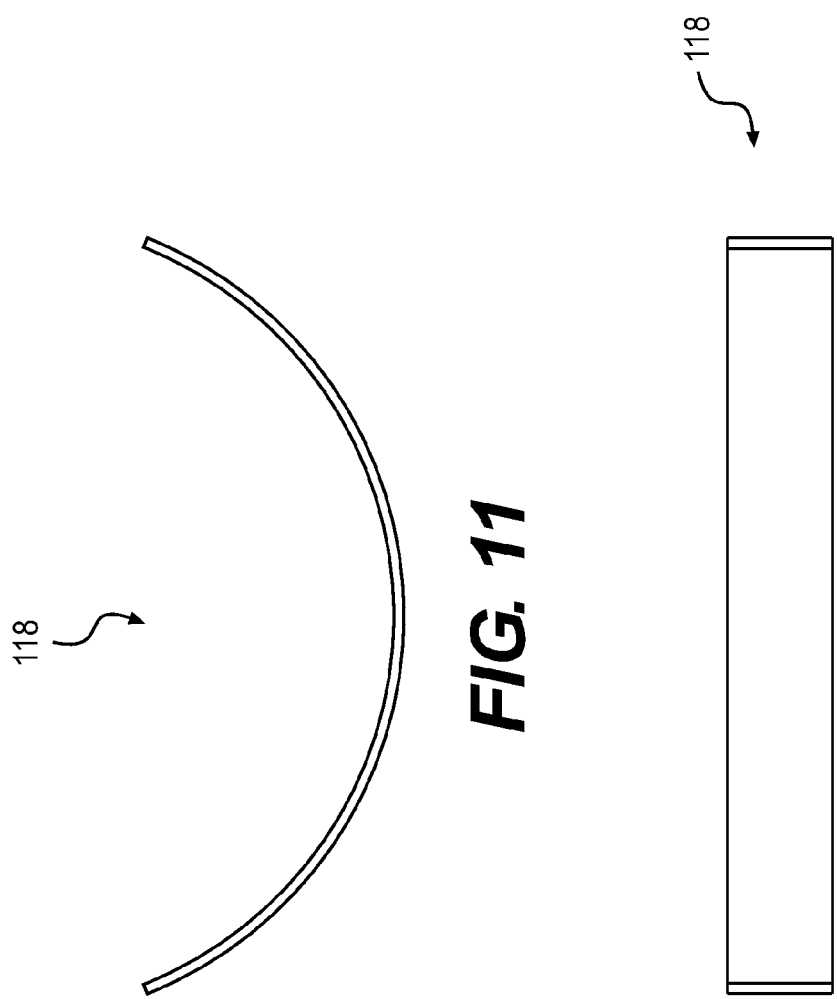

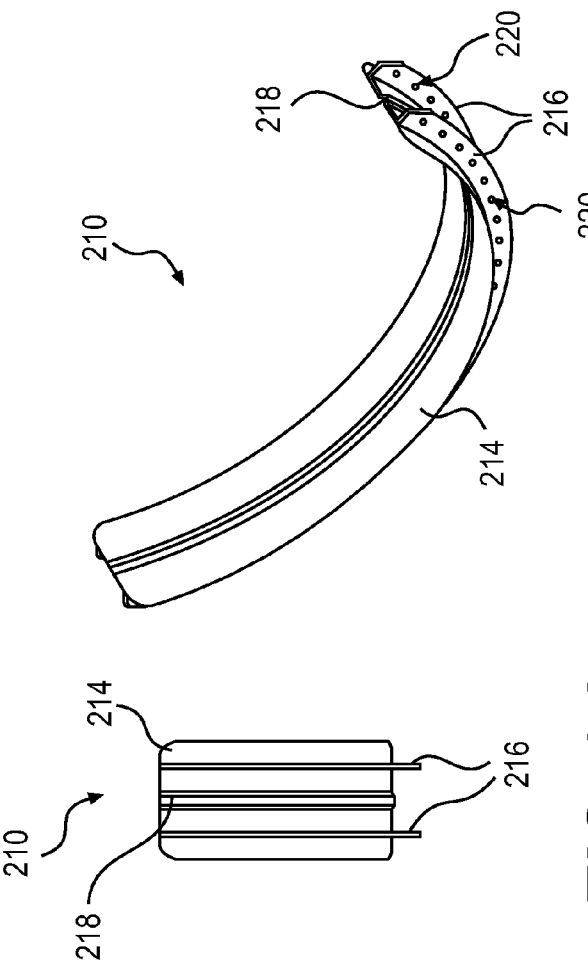
FIG. 25
FIG. 24
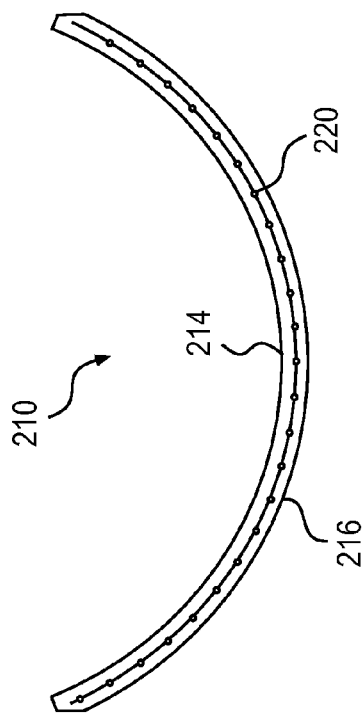
FIG. 23

TRANSPORT TANK CRADLE ASSEMBLY

CROSS-REFERENCE

The present application claims priority to U.S. Provisional Patent Application No. 61/369,309, filed Jul. 30, 2010, the entirety of which is incorporated herein by reference.

FIELD OF THE INVENTION

The present invention relates to transport tank assemblies having cradle assemblies for mounting the tanks to trucks.

BACKGROUND

Many industries use trucks for the transportation of their goods. To transport a liquid, a truck is provided with a transport tank mounted to a frame of the truck or to a trailer of the truck. When the liquid is to be transported under pressure, the transport tank needs to be constructed to withstand this pressure. One example of such a liquid is a liquefied petroleum gas, such as propane. Typically, in order to withstand internal pressures, transport tanks are made of metal, such as carbon or stainless steel, and have a cylindrical central section and two generally curved ends. Although metal transport tanks such as the one described above are suitable for the transport of pressurized liquids they have some drawbacks.

In most jurisdictions, the total truck weight (truck plus payload) or total trailer weight (trailer plus payload) is not allowed to exceed a predetermined maximum weight. As a metal transport tank is heavy, the maximum weight of the payload that can be transported is less than could otherwise be transported if the transport tank was lighter. Also, a metal transport tank tends to corrode over time which requires maintenance, repair, and in some cases replacement of the tank.

One solution to at least some of the above-mentioned drawbacks of metal transport tanks consist is making the transport tank out of composite material. For tanks of the same volume, composite transport tanks are lighter than metal transport tanks. As a result, by using a composite transport tank the maximum weight of the payload that can be transported can be increased. Also, composite materials are typically less susceptible to corrosion than metals.

In order to attach a transport tank to a frame or trailer of a truck, one method consists in providing metal cradles connected to the tank and which provide connections for connecting to the trailer or frame. In metal transport tanks, the cradles are welded to the tank body.

However, in composite transport tanks this arrangement cannot be used. As would be understood, metal cradles cannot be welded to a composite material tank body.

Therefore, there is a need for a cradle assembly for mounting a transport tank made of composite material to a truck.

Also, due to the relatively low temperatures of some of the pressurized liquids that can be transported in such transport tanks and to the wide range of ambient temperatures in which the transport tank is to be used, a transport tank expands and contracts during use. For example, an empty tank which is filled with a low temperature pressurized liquid will contract. The pressure inside the transport tank also affects its volume. Additionally, the operational loads applied to the cradle assembly also vary (i.e. full tank versus empty tank).

Therefore, there is a need for a cradle assembly that can accommodate the expansion and contraction and the varying operational loads of a transport tank.

SUMMARY

It is an object of the present to ameliorate at least some of the inconveniences present in the prior art.

In one aspect, a transport tank assembly for mounting to a truck has a composite tank body having an inner side and an outer side, and at least one cradle assembly connected to the outer side of the tank body. Each cradle assembly has a cradle having an inner side and an outer side, and at least one band of composite material disposed over the outer side of the cradle and at least a portion of the outer side of the tank. A length of the band of composite material is greater than a length of the cradle. The band of composite material connects the cradle to the tank body. The cradle and the at least one band extend in a generally lateral direction of the tank body.

In an additional aspect, a strip of low shear modulus material is bonded between the outer side of the tank body and the inner side of the cradle.

In another aspect, the tank body has a protrusion extending from the outer side of the tank body for each cradle assembly. The protrusion spans at least a portion of a lower portion of a perimeter of the tank body. The cradle of each cradle assembly has a concavity receiving the protrusion therein.

For purposes of this application, the adjective "composite", such as in "composite tank body", indicates that the associated element is made at least in part of composite materials. Examples of composite materials include, but are not limited to, carbon fibers with epoxy resin and aramid fibers with acrylate-based resin. Also, a "band" used in relation with composite materials, such as a carbon fiber and resin band, should be understood as being formed of one or more layers of the composite material in order to obtain a desired thickness of the band or as being formed by filament winding composite material in order to obtain a desired thickness and width of the band. It is contemplated that a band of composite material could be formed by other methods. Also, the shear modulus of materials is expressed herein in ksi (kilo-pound-force per square inch) and it's metric equivalent Gpa (gigapascal). The shear modulus of materials provided herein correspond to the minimum shear modulus over a range of temperatures of −50° F. to 200° F. (−45.6° C. to 93.3° C.).

Embodiments of the present invention each have at least one of the above-mentioned aspects, but do not necessarily have all of them.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 7 is a rear elevation view of a liner of the transport tank of FIG. 4;

FIG. 8 is a right side elevation view of the liner of FIG. 7;

FIG. 11 is an end view of a cradle of a first embodiment of a cradle assembly of the transport tank of FIG. 4;

FIG. 12 is a top view of the cradle of FIG. 11;

FIG. 23 is an end view of one of the cradles of FIG. 21;

FIG. 24 is a side view of the cradle of FIG. 23;

FIG. 25 is a perspective view of the cradle of FIG. 23;

DETAILED DESCRIPTION

Figure 1:
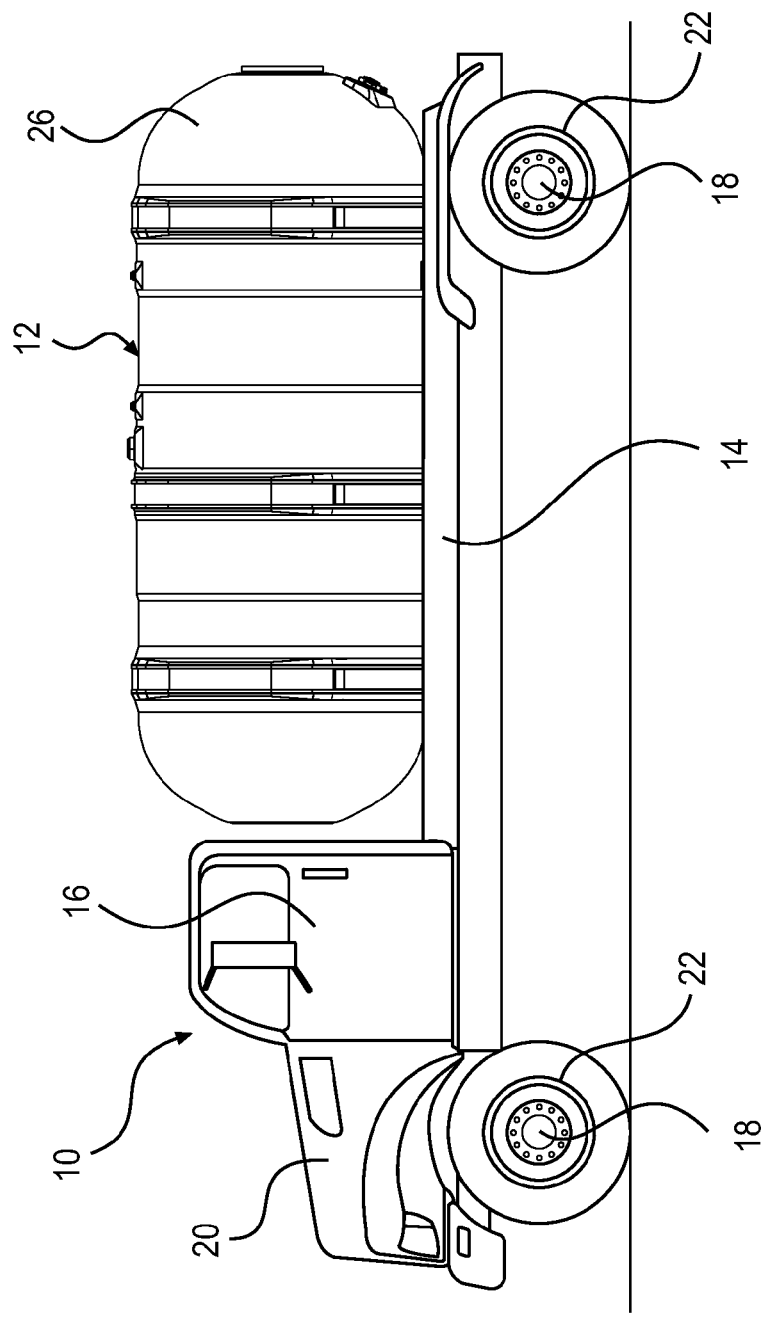
FIG. 1 is a left side elevation view of a truck having a transport tank.

A truck 10 having a transport tank 12 in accordance with aspects of the present invention will be described with respect to FIG. 1. The truck 10 has a frame 14 to which a cabin 16, two axles 18, an engine (not shown), and the tank 12 are connected. The engine is covered by a hood 20. The engine drives at least one of the two axles 18. A plurality of wheels 22 are mounted to the axles 14. It is contemplated that the truck 10 could have more than two axles 18.

Figure 2:
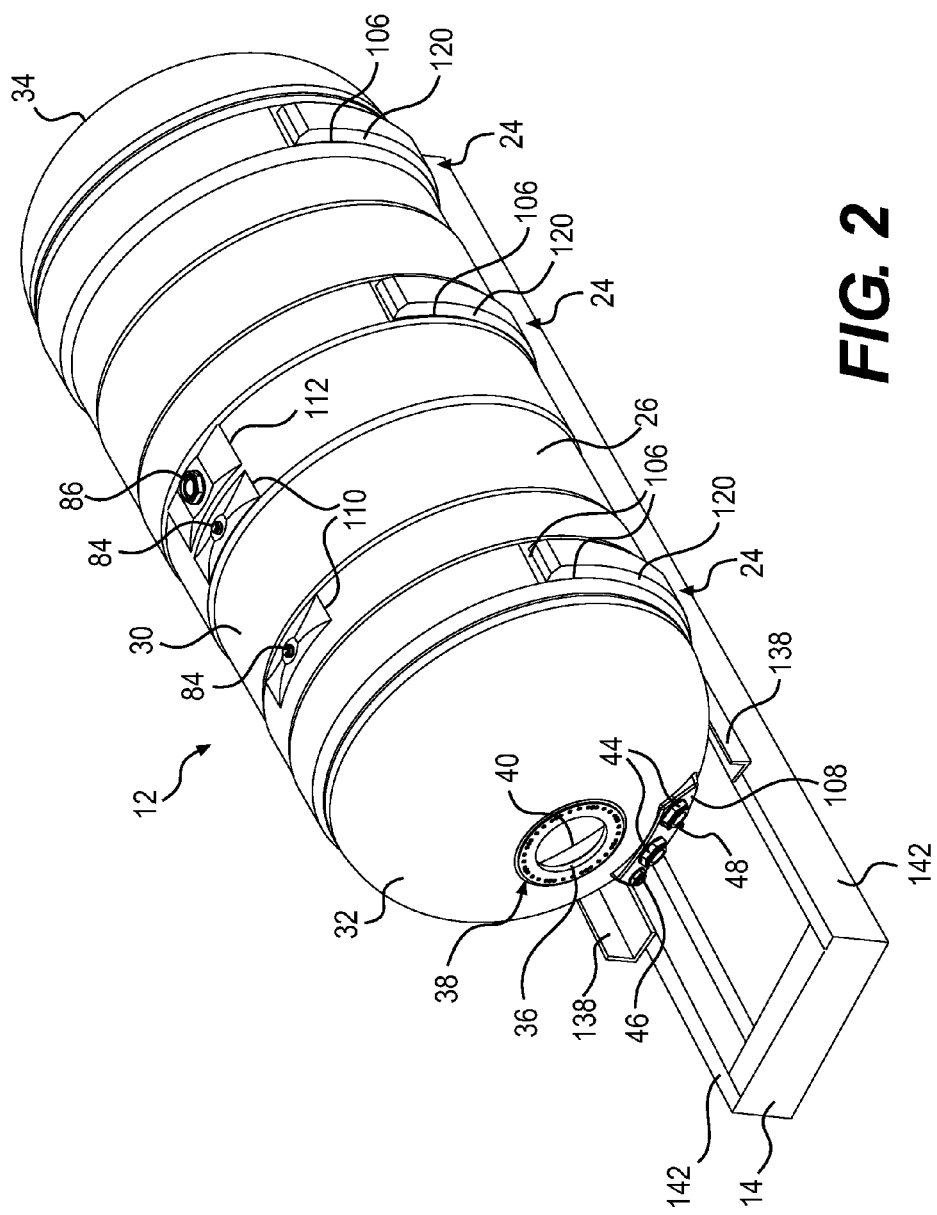
FIG. 2 is a perspective view taken from a top, rear, right side of the transport tank and a portion of a frame of the truck of FIG. 1.
Figure 3:
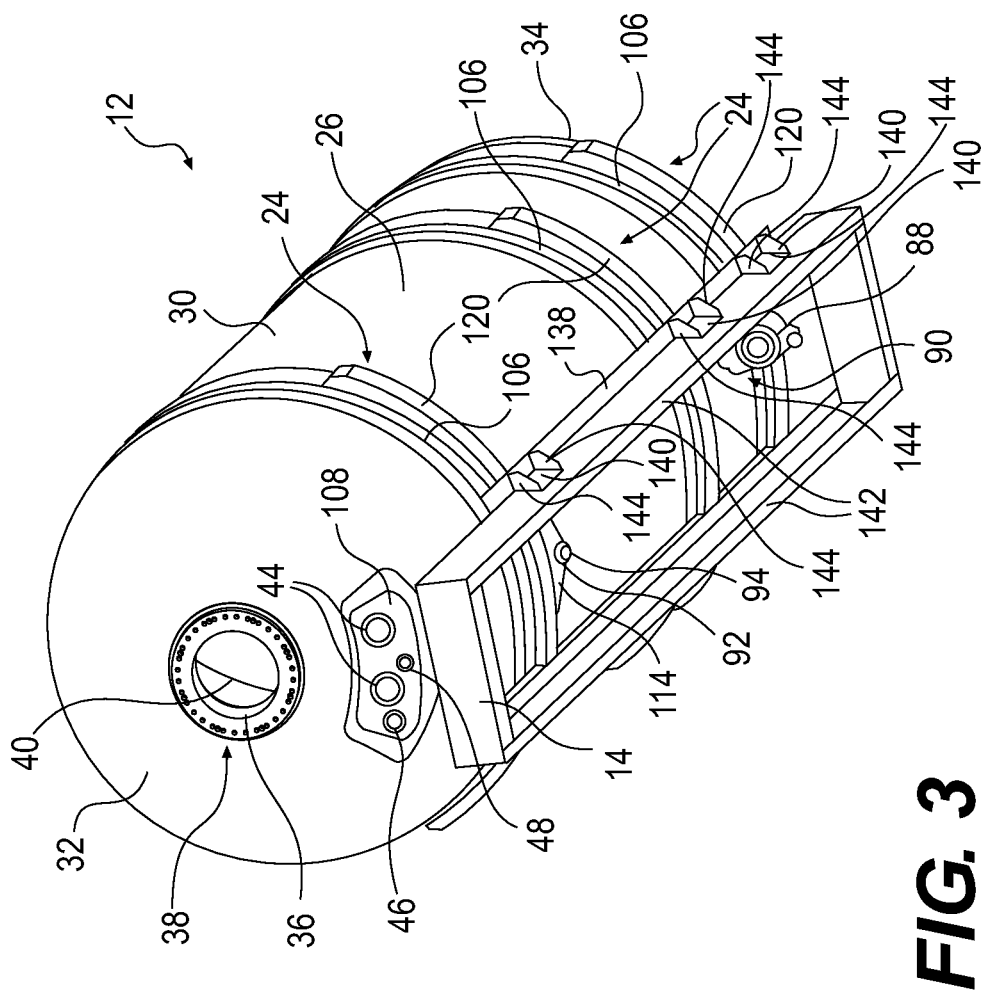
FIG. 3 is a perspective view taken from a bottom, rear, right side of the transport tank and a portion of a frame of the truck of FIG. 1.

As seen in FIGS. 2 and 3, the tank 12 is connected to the frame 14 of the truck 10 via three cradle assemblies 24. It is contemplated that more or less than three cradle assemblies 24 could be used depending on the size of the tank 12. The cradle assemblies 24 will be described in greater detail below.

It is contemplated that the truck 10 could have a flatbed mounted to the frame 14. In such an embodiment, the tank 12 would be mounted to the flatbed. It is also contemplated that the tank 12 could be mounted to a truck of a different type than the truck 10 shown in FIG. 1. For example, the truck could be a tractor-trailer consisting of a tractor and of a full trailer or semitrailer hooked to the tractor. In such an embodiment, the tank would be mounted to the full trailer or semitrailer.

Figure 4:
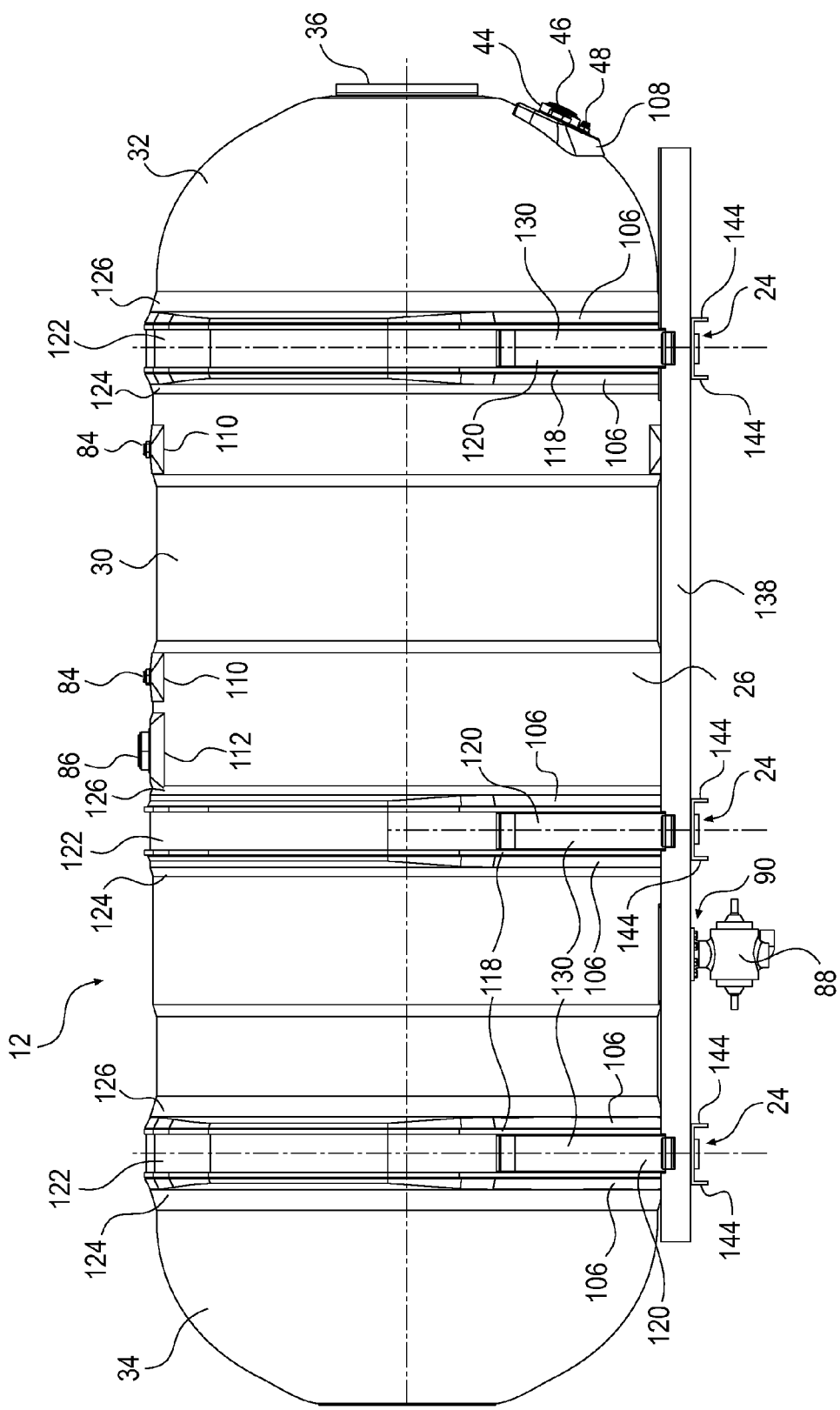
FIG. 4 is a left side elevation view of the transport tank of FIG. 1.
Figure 5:
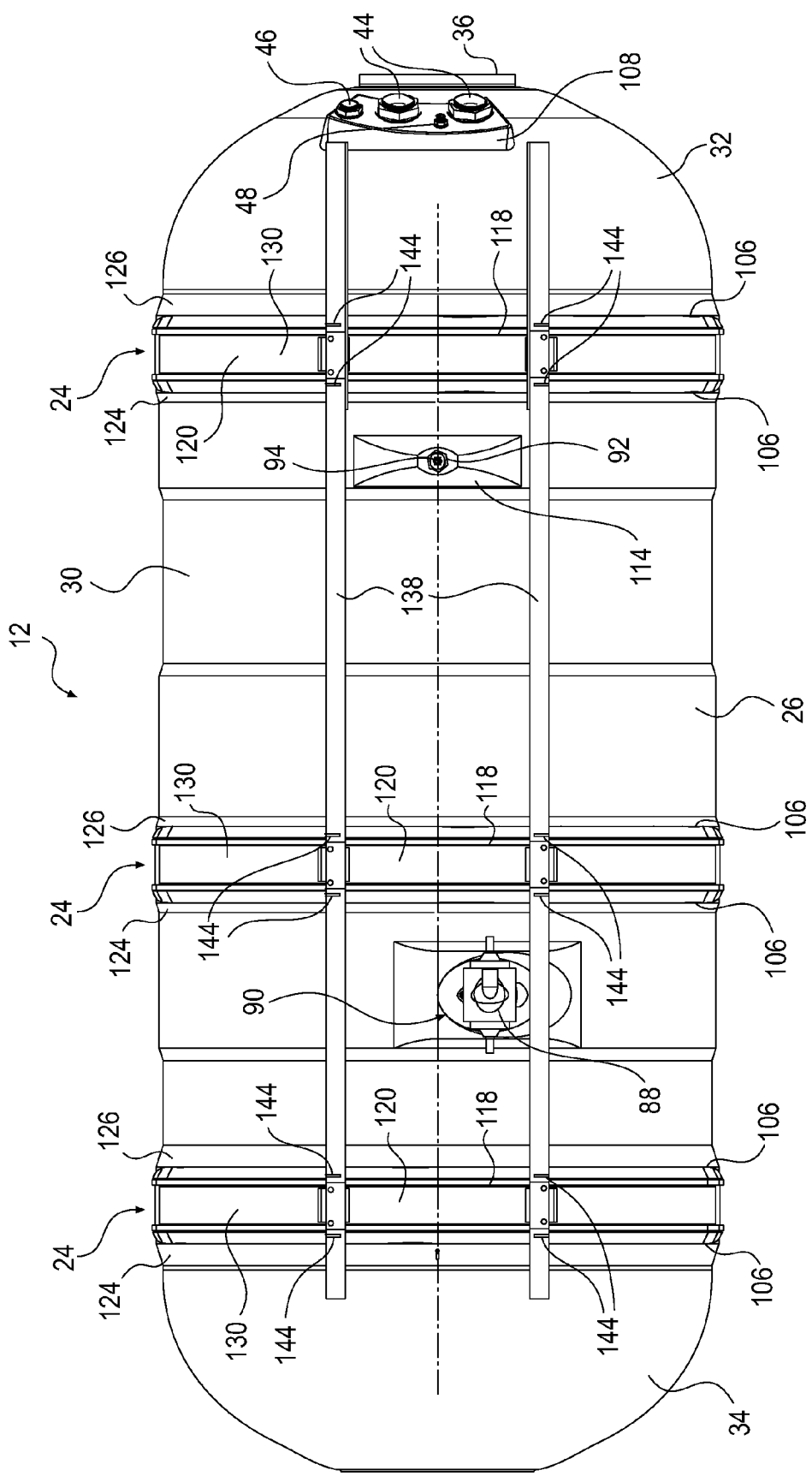
FIG. 5 is a bottom plan view of the transport tank of FIG. 4.
Figure 6:
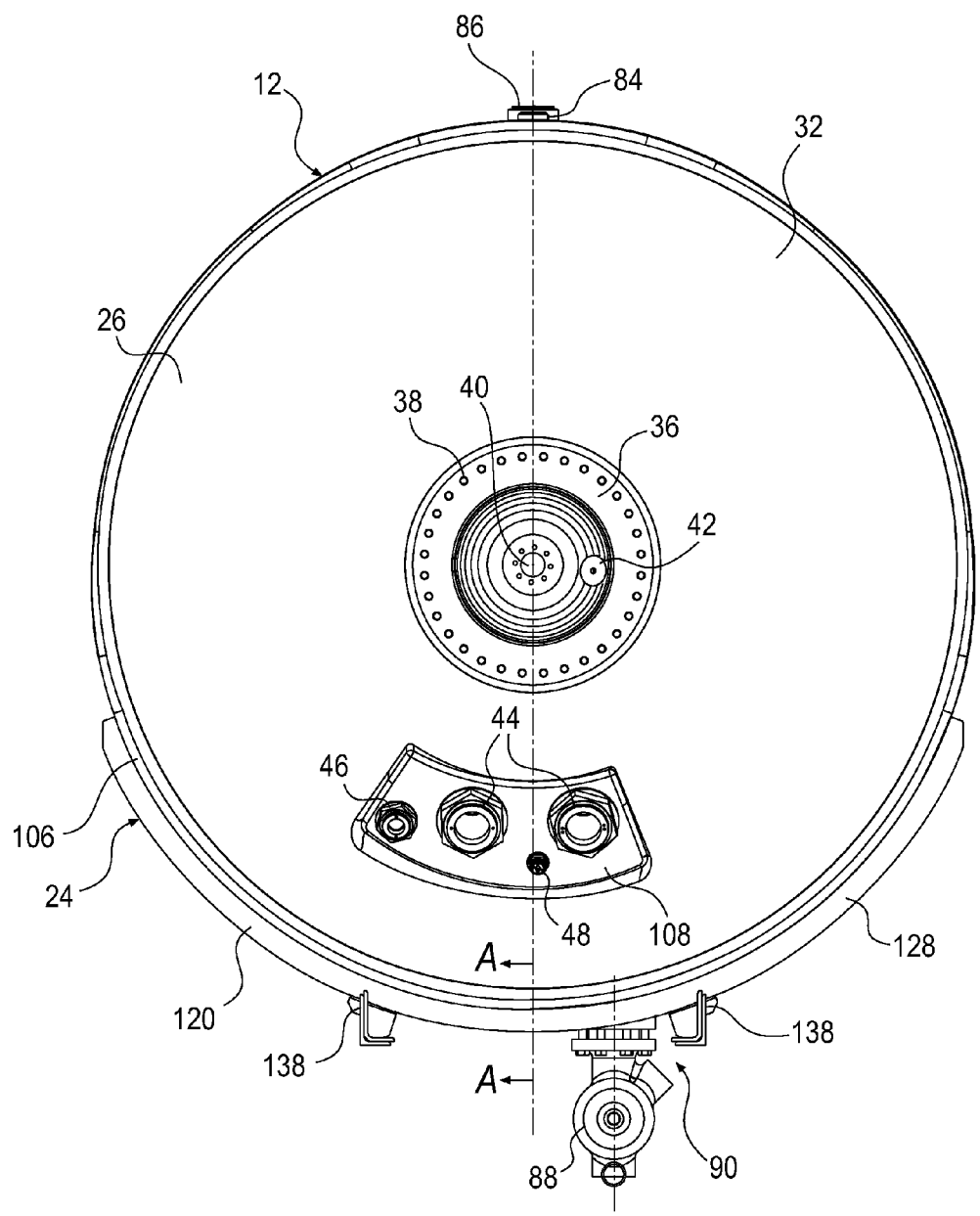
FIG. 6 is a rear elevation view of the transport tank of FIG. 4.

Turning now to FIGS. 2 to 6, the tank 12 will be described in more detail. The tank body 26 has a cylindrical central section 30 closed by two generally curved ends 32, 34. It is contemplated that the tank body 26 could be shaped so as to have a non-circular lateral cross-section, such as an ellipsoidal lateral cross-section. A man-way is formed in the rear end 32 of the tank body 26 to permit the passage of a person inside the tank 12 for maintenance, cleaning, and assembly of components of the tank 12. The man-way is closed by a cover 36 which is fastened by a plurality of threaded fasteners 38. As best seen in FIG. 6, a float gauge 40 is inserted in an aperture in the center of the cover 36. The float gauge 40 provides an indication of the level of liquid in the tank 12. A temperature gauge 42 is inserted in another aperture in the cover 36. The temperature gauge 42 provides an indication of the temperature of the liquid in the tank 12.

A number of fittings 44, 46 and 48 are provided in the rear end 32 of the tank body 26 below the man-way 36. The fittings 44, 46 and 48 are made of carbon steel. However, it is contemplated that the fittings 44, 46 and 48 could be made of other types of metal or of plastic, such as fiber reinforced plastic.

Figure 9:
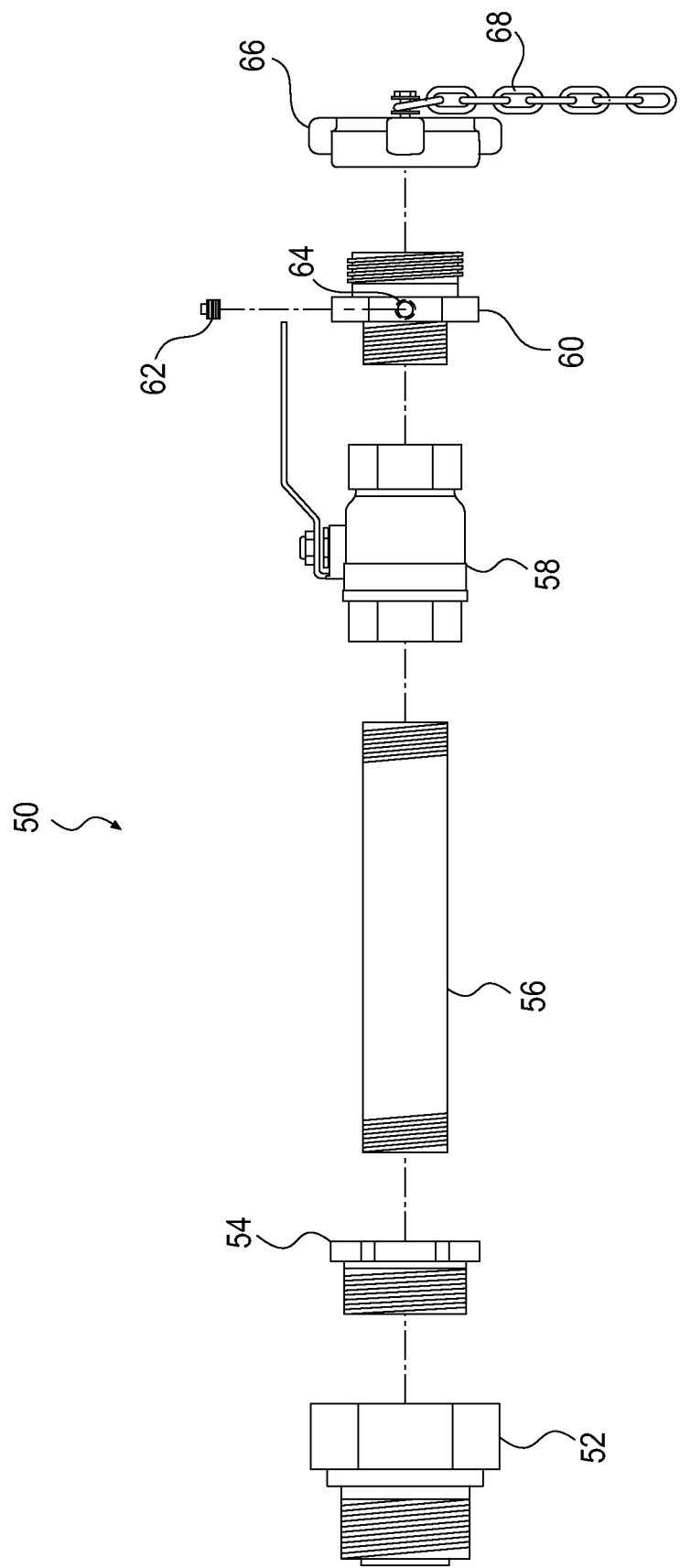
FIG. 9 is an exploded view of a pipe and valve assembly for attachment to a spray fill fitting of the transport tank of FIG. 4.

The two fittings 44 are referred to as spray fill fittings 44. A pipe and valve assembly 50, shown in FIG. 9, is connected to the outer end of the fittings 44. As shown in FIG. 9, the assembly 50 has a back pressure check valve 52. The valve 52 is threaded into the spray fill fitting 44 and prevents vapor from flowing out of the tank 12. A bushing 54 is threaded into the valve 52. A pipe 56 has one end threaded in the bushing 54 and another end threaded in an end of a manually operated valve 58. An adaptor 60 is threaded in the other end of valve 58. A plug 62 fits into a hole 64 in the side of the adaptor 60. The hole 64 gives an operator of the truck 10 the ability to install a vent valve and release pressure between the valve 58 and a removable cap 66 before connecting a fill hose. The removable cap 66 is threaded on the end of the adaptor 60. The cap 66 is connected to the tank 12 or truck 10 by a chain 68 to prevent the cap 66 from being misplaced when it is removed from the end of the adaptor 60. In the interior of the tank 12, pipes (not shown) are connected, by welding for example, to the spray fill fittings 44. The pipes are suspended from the top of the tank body 26, as described in greater detail below, such that the outlets of the pipes are higher than the fittings 44. To fill the tank 12, the cap 66 is removed from the adaptor 60. A fill hose from a storage tank holding the liquid to be put in the tank 12 is connected to the adaptor 60. The valve 58 is then opened and a pump turned on to pump liquid through the assembly 50 into the pipe and is finally sprayed inside the tank 12 (hence the name spray fill fitting for the fitting 44). Once the desired amount of liquid is in the tank 12, the pump is turned off, the valve 58 is closed and the cap 66 is threaded back on the adaptor 60. The above is simply a general description of the major steps necessary to fill the tank 12. It should be understood that additional steps could be necessary. By providing two spray fill fittings 44, it is possible to fill the tank 12 faster.

Figure 10:
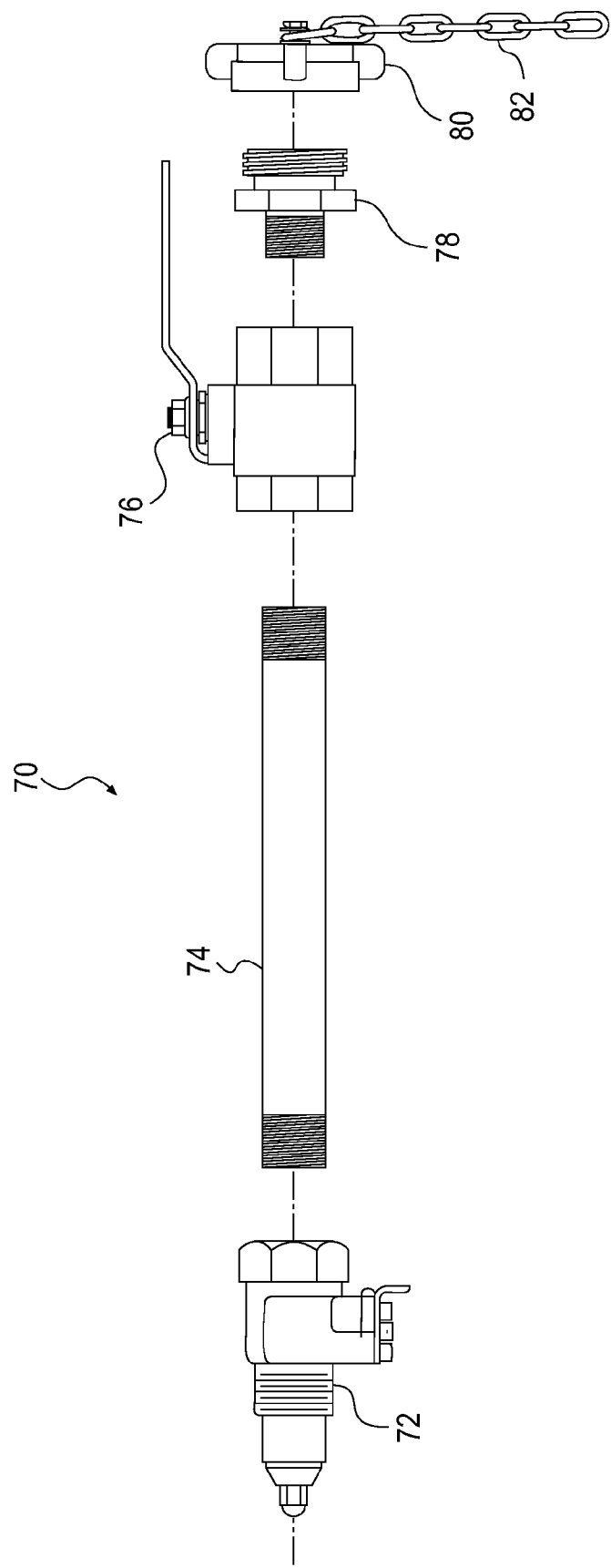
FIG. 10 is an exploded view of a pipe and valve assembly for attachment to a vapor fitting of the transport tank of FIG. 4.

The fitting 46 is referred to as a vapor fitting 46. A pipe and valve assembly 70, shown in FIG. 10, is connected to the outer end of the fittings 46. As shown in FIG. 10, the assembly 70 has a valve 72. The valve 72 is threaded into the vapor fitting 46 and prevents vapor from accidentally releasing from the tank 12. A pipe 74 has one end threaded in the valve 72 and another end threaded in an end of a manually operated valve 76. An adaptor 78 is threaded in the other end of valve 76. A removable cap 80 is threaded on the end of the adaptor 78. The cap 80 is connected to the tank 12 or truck 10 by a chain 82 to prevent the cap 80 from being misplaced when it is removed from the end of the adaptor 78. In the interior of the tank 12, a pipe (not shown) is connected, by welding for example, to the vapor fitting 46. By removing the cap 80 from the adaptor 78 and by opening the valve 76, the operator can release vapor pressure from inside the tank 12.

The fitting 48 receives a pressure gauge (not shown) connected to a tube (not shown) disposed inside the tank 12 and a manual valve. The tube has an opened end disposed inside the tank 12 at a level corresponding to 85% of the volume of tank body 26. When the level of liquid inside the tank body 26 reaches the end of the tube, the tank body 26 is 85% full. The operator can see that this volume is reached by opening the manual valve and determining if liquid is present in the valve. It is contemplated that this level may vary depending on local regulations.

A number of fittings 84 and 86 are provided in the top of the tank body 26 along the longitudinal centerline of the tank 12. It is contemplated that the fittings 84 and 86 could be offset from the centerline of the tank 12. The fittings 84 and 86 are made of carbon steel. However, it is contemplated that the fittings 84 and 86 could be made of other types of metal or of plastic, such as fiber reinforced plastic.

The two fittings 84 each hold a hanger (not shown) which extends inside the tank body 86. The hangers hold the various pipes and tubes described above inside the tank body 26.

The fitting 86 receives a pressure relief valve (not shown). The pressure relief valve opens when a predetermined pressure is reached inside the tank body 26 thus preventing the tank body 26 from becoming over pressurized.

As seen in FIGS. 3 to 6, a pump 88 is mounted to a bottom of the tank body 26. The pump 88 is used to pump liquid out of the tank 12. The pump 88 is laterally offset from the longitudinal centerline of the tank 12 in order to facilitate operation of the pump 88 and so as not to interfere with other components of the truck 10 such as the frame 14. However, it is contemplated that the pump 88 could be mounted along the longitudinal centerline or at any other position on the tank body 26 depending on the structure of the truck 10 on which the tank 12 is mounted. The pump 88 is mounted to the tank body 26 via a pump mounting assembly 90.

Since the pump 88 is offset from the longitudinal centerline of the tank 12, the inlet to the pump 88 provided in the pump mounting assembly 90 is located higher than the lowest portion of the tank body 26. As such, the pump 88 cannot pump all of the liquid out of the tank body 26. To allow removal of all of the liquid from the tank body 26, a drain fitting 92 (FIG. 5) is provided in the bottom of the tank body 26 along the longitudinal centerline of the tank 12. The drain fitting 92 is made of carbon steel. However, it is contemplated that the drain fitting 92 could be made of other types of metal or of plastic, such as fiber reinforced plastic. The drain fitting 92 is closed by a threaded plug 94 (FIG. 5). By removing the threaded plug 94, the content of the tank body 26 can be drained by the drain fitting 92.

Although not shown, a baffle system is provided inside the tank body 26. The baffle system helps reduce sloshing of the liquid inside the tank body 26 during acceleration and deceleration of the truck 10.

Figure 15:
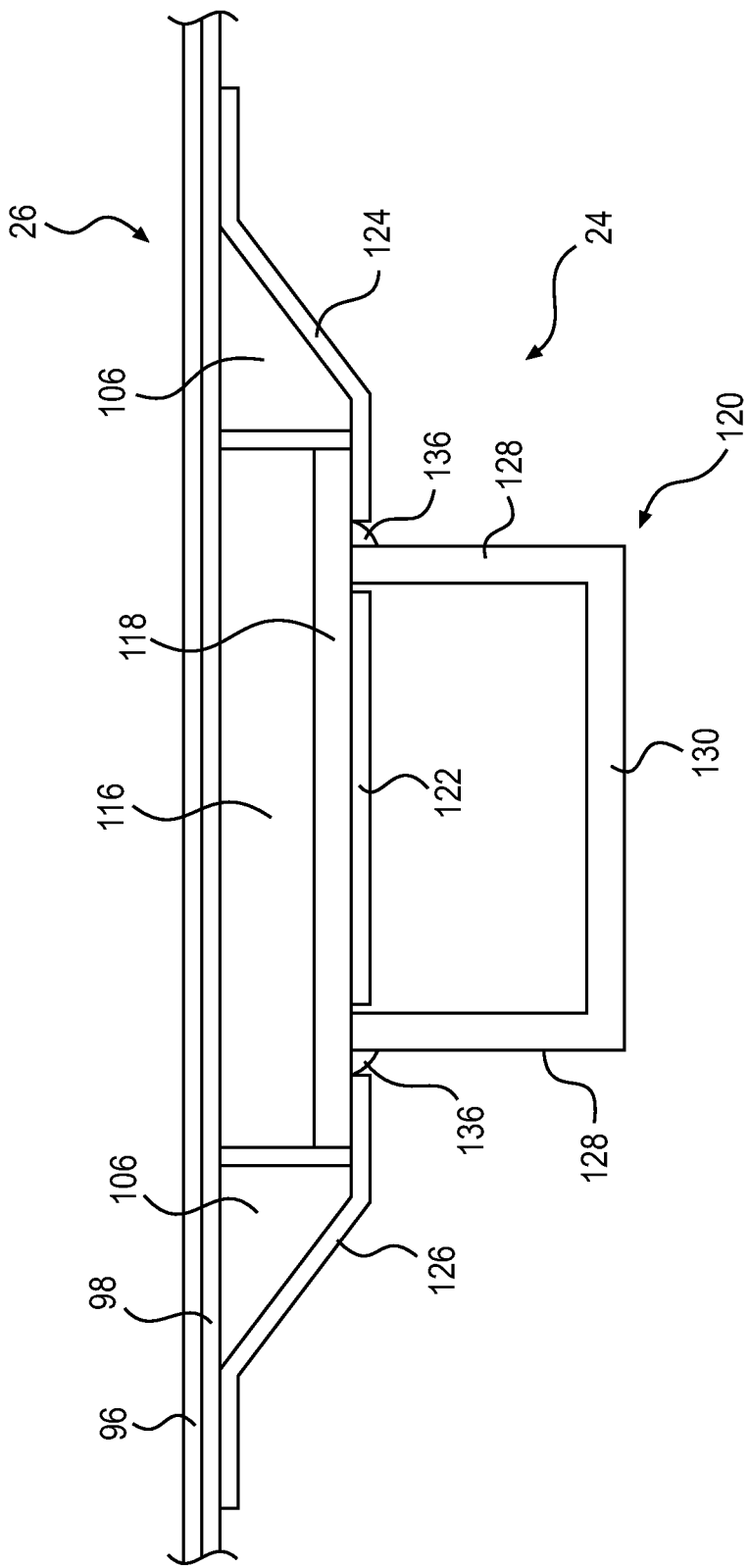
FIG. 15 is a schematic cross-sectional view of the transport tank and of the first embodiment of the cradle assembly of the transport tank of FIG. 4 taken through line A-A of FIG. 6.

The structure and construction of the tank 12 will now be described in more detail. As seen in FIGS. 7, 8 and 15, the tank body 26 is made of a liner 96 disposed inside a composite outer shell 98, thus forming a composite tank body 26.

As shown in FIG. 8, the liner 96 has a cylindrical central section 100 and two generally curved ends 102, 104. The liner 96 is made of high density polyethylene (HDPE) and is formed by a rotational molding process. The liner 96 is non-permeable. It is contemplated that the liner 96 could be made of another type of polymer. It is also contemplated that the liner 96 could be made of metal or other material. It is also contemplated that the liner 96 could be made by another type of process, such as blow-molding. It is also contemplated that the liner 96 could be permeable. A man-way fitting (not shown) is bonded around an aperture in the end of the generally curved end 102 of the liner 96. In the finished tank 12, the man-way cover 36 is bolted onto the man-way fitting.

The outer shell 98 is then formed by winding carbon fibers impregnated with epoxy resin around the liner 96. The carbon fibers are wound helically (i.e. at an acute angle to the longitudinal central axis of the liner 96) and circumferentially (i.e. in a generally lateral direction of the liner 96) around the liner 96 so as to cover the liner 96. The angles at which the carbon fiber helical and circumferential windings are applied and the number of layers to be applied depend on the size of the tank body 26, the amount of internal pressure that the tank body 26 needs to withstand, and the specific material characteristics of the carbon fiber and resin being used. It is contemplated that other types of composite materials could be used, such as aramid fibers impregnated with resin. It is contemplated that the fibers could be wound dry and that resin could be applied to the fibers as they are being wound or after a certain number of windings have been wound around the liner 96. Some of the windings cover portions of the man-way fitting and hold it in place.

Three pairs of laterally oriented carbon fiber and resin tank bands 106 are then laid on an outer surface of the shell 98 on a lower portion of the perimeter of the tank body 26. One pair of tank bands 106 is provided for each one of the cradle assemblies 24. As seen in FIGS. 2 to 5, the tank bands 106 are disposed on either side of the cradle assemblies 24 in close proximity thereto. It is contemplated that the tank bands 106 could span the entire perimeter of the tank body 26.

A number of outer bosses 108, 110, 112 and 114 are mounted on the outer side of the tank body 26 in the areas where the fittings 44, 46, 48, 84, 86, and 92 will be located. The outer bosses 108, 110, 112 and 114 are made of layers of composite material which are cut and set in molds corresponding to the shapes of the outer bosses 108, 110, 112 and 114. The molds with the layers of composite material are then cured. The outer bosses 108, 110, 112 and 114 are then bonded to the outer surface of the tank body 26. The number of layers and the angles at which the fibers are laid for each outer boss 108, 110, 112 and 114 depend on the dimensions of the apertures to insert each of the fitting 44, 46, 48, 84, 86, and 92 and the strength characteristics of the tank body 26 in the area where each of the fittings 44, 46, 48, 84, 86, and 92 will be located. It is contemplated that the outer bosses 108, 110, 112 and 114 could also be formed by polymeric, metallic, or composite cores covered by carbon fibers and resin or other composite material. It is also contemplated that the outer bosses 108, 110, 112 and 114 could be formed by laying additional layers of carbon fibers impregnated with epoxy resins to the areas where the apertures will be located. It is also contemplated that the outer bosses 108, 110, 112 and 114 could also be formed by interspersing layers of carbon fiber and resin between windings forming the outer shell 98 of the tank body 96

Due to the relative proximity of the apertures for the fittings 44, 46 and 48, these apertures are provided with a common outer boss 108. However, it is contemplated that individual outer bosses could be provided for each one of the fittings 44, 46 and 48. The apertures for the fittings 84, 86 and 92 are each provided with their own outer boss 110, 112 and 114, respectively.

It is contemplated that the aperture provided for the pump mounting assembly 90 could also be provided with an outer boss similar to outer bosses 108, 110, 112 and 114.

Once the tank bands 106 have been laid on the tank body 26, the tank body 26 and the tank bands 106 are cured.

Once cured, the outer bosses 108, 110, 112 and 114 are bonded to the tank body 28. The apertures for the fittings 44, 46, 48, 84, 86, and 92 are then cut through the outer bosses 108, 110, 112, and 114, the outer shell 98 and the liner 96. The apertures for the pump mounting assembly 90 are also cut. The fittings 44, 46, 48, 84, 86, and 92 and the pump mounting assembly 90 are then mounted to the tank body 26.

Also, once cured, the tank bands 106 are machined to give them a generally triangular cross-section as shown in FIG. 15. However it is contemplated that the tank bands 106 could be machined to have other cross-sectional shapes. It is also contemplated that the tank bands 106 could not be machined. For example, the tank bands 106 could be formed by providing cores of the desired cross-section and length on the tank body 26 and by covering the cores with carbon fiber and resin prior to curing so as to form tank bands 106 of the desired cross-section without machining. It is also contemplated that the tank bands 106 could be formed by laying a large band of carbon fiber and resin for each pair of tank bands 106 prior to curing and, once cured, by machining each large band to form a pair of tank bands 106. It is contemplated that the tank bands 106 could be bonded or otherwise connected to the tank body 26 after curing.

Turning now to FIGS. 2 to 6 and 11 to 15, one of the cradle assemblies 24 and the attachment of the tank 12 to the frame 14 using the cradle assemblies 24 will be described.

Each cradle assembly 24 includes a strip 116, a cradle 118, and a support 120. For simplicity, only one of the cradle assemblies 24 will be described. It should be understood that the other cradle assemblies 24 are the same. It is contemplated each cradle assembly 24 could be different in order to accommodate for variations in the profile of the tank body 26 depending on their locations or to avoid interference with other components of the truck 10 for example.

The strip 116 is made of low shear modulus material. Rubber and elastomeric materials are examples of low shear modulus material. The low shear modulus material has a shear modulus of less than 10 ksi (0.069 GPa). In some embodiment, the low shear modulus material has a shear modulus of less than 5 ksi (0.034 GPa). In other embodiments, the low shear modulus material has a shear modulus of less than 2 ksi (0.014 GPa). In the present embodiment, the strip is made of silicone rubber which has a shear modulus of about 0.6 ksi (0.004 GPa). The strip 116 is bonded to the lower portion of the perimeter of the outer surface of the tank body 26 between two of the tank bands 106. As can be seen in FIG. 15, the strip 116 is proximate to both tank bands 106. The strip 116 is bonded to the tank body 26 using an adhesive such as an epoxy paste adhesive. In addition to bonding the strip 116 to the tank body 26, the adhesive also acts as a liquid shim to accommodate surface variations between the outer surface of the tank body 26 and the inner surface of the strip 116.

The cradle 118, shown in FIGS. 11 and 12, consists of a curved piece of carbon steel having a generally constant cross-section. It is contemplated that the cradle 118 could be made of another type of metal such as aluminum. The curvature of the cradle 118 corresponds to the curvature of the outer surface of the tank body 26 and has a radius of curvature corresponding to the radius of the tank body 26 plus the thickness of the strip 116 (plus adhesive). It is contemplated that, in embodiments where the tank body 26 has a non-circular cross-section, the cradle 118 would have a profile corresponding to the profile of the outer surface of the tank body 26 where it is to be connected.

As seen in FIG. 15, the cradle 118 is bonded over an outer surface of the strip 116. As such, the cradle 118 extends in a generally lateral direction of the tank body 26. In the present embodiment, the cradle 118 is bonded to the strip 116 with the same adhesive being used to bond the strip 116 to the tank body 26. It is contemplated however that other adhesives could be used. Since the strip 116 is made of a low shear modulus material, when the tank body 26 undergoes expansion or contraction due to temperature or pressure changes in the tank body 26, the strip 116 deforms thus reducing the effect of such volumetric changes on the cradle 118.

Figure 14:
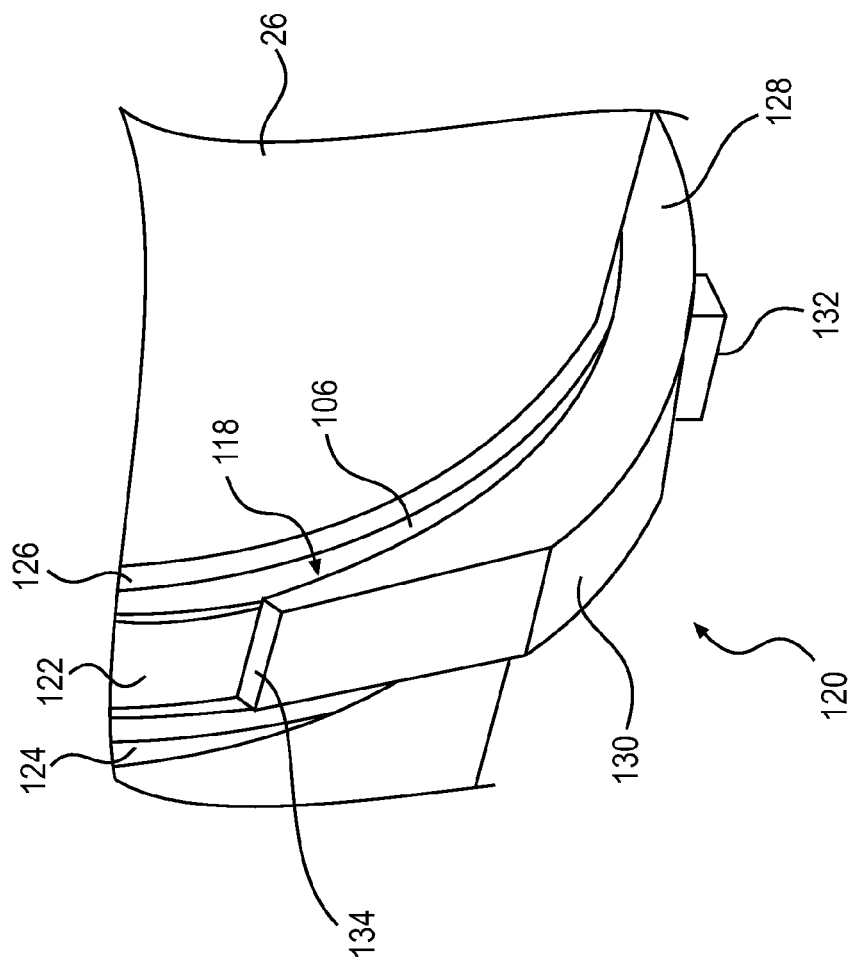
FIG. 14 is a close-up perspective view of the first embodiment of the cradle assembly of the transport tank of FIG. 4.

As seen in FIGS. 4, 14 and 15, to connect the cradle 118 to the tank body 26, three bands 122, 124 and 126 of carbon fiber and resin are wound circumferentially over the outer side of the cradle 118 and the entire perimeter of the tank body 26. It is contemplated that one or more of the bands 122, 124 and 126 could be wound around only a portion of the perimeter of the tank body 26. In such an embodiment, the one or more bands 122, 124 and 126 are longer than the cradle 118 so as to cover the entire length of the cradle 118 and extend beyond the cradle 118 to attach to the outer surface of the tank body 26. It is contemplated that the bands 122, 124 and 126 could also be made of another type of composite material. As seen in FIG. 15, the band 122 is disposed over the central portion of the cradle. The band 124 is disposed over one end of the cradle assembly 118, over a corresponding one of the tank bands 106 and over the portion of the outer surface of the tank body 26 longitudinally adjacent to the tank band 106 (longitudinally with respect to the longitudinal direction of the tank body 26). Similarly, the band 126 is disposed over the other end of the cradle assembly 118, over the other one of the tank bands 106 and over the portion of the outer surface of the tank body 26 longitudinally adjacent to this tank band 106. It is contemplated that the bands 124, 126 could be narrower so as not to extend longitudinally beyond the tank bands 106. It is contemplated that one or two of the bands 122, 124 and 126 of carbon fiber and resin could be omitted. For example, the cradle 118 could be connected to the tank body 26 only by the band 122. In another example, the cradle 118 could be connected to the tank body 26 only by the bands 124 and 126.

Figure 13:
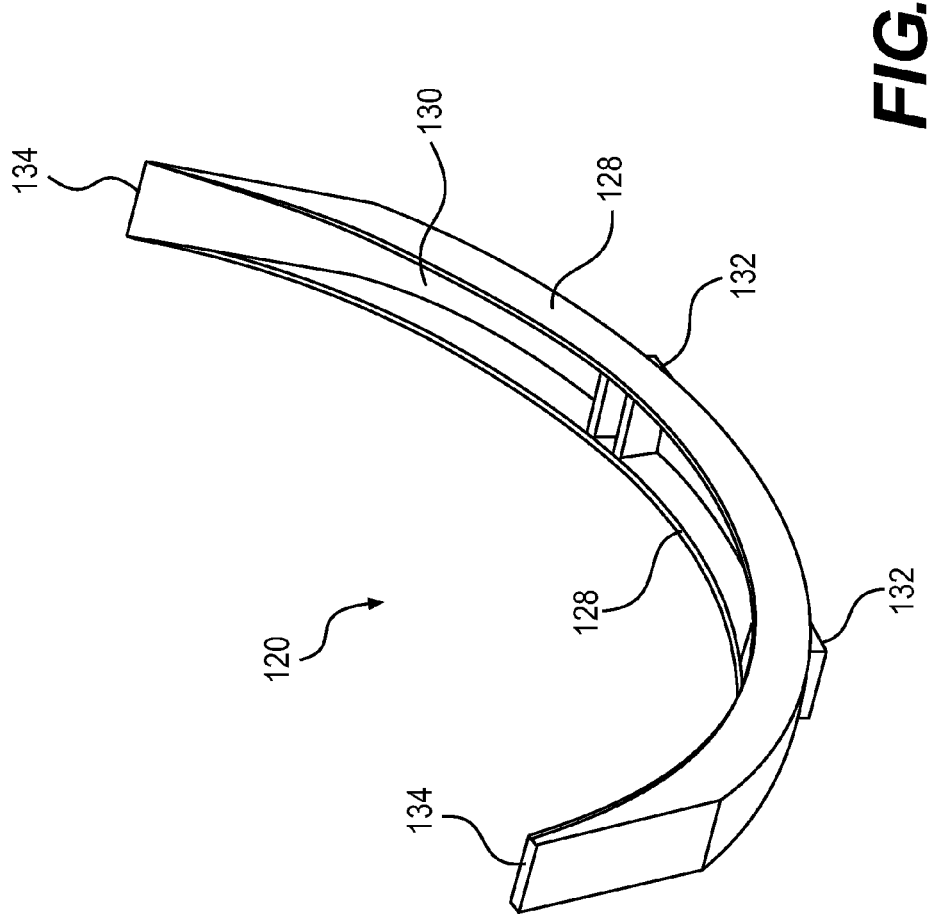
FIG. 13 is a perspective view of a support of the first embodiment of the cradle assembly of the transport tank of FIG. 4.

The support 120, shown in FIG. 13, is made of two parallel curved flanges 128 connected by a cap 130. The flanges 128 and the cap 130 can be integrally formed or otherwise connected together by welding for example. The curvature of the flanges 128 corresponds to the curvature of the outer surface of the cradle 118. The support 120 also includes two laterally spaced apart fittings 132 disposed between and connected to the flanges 128 and extending through a bottom of the cap 130. The flanges 128, cap 130, and fittings 132 are made of carbon steel. It is contemplated that the flanges 128, cap 130, and fittings 132 could be made of another type of metal such as aluminum. The fittings 132 provide horizontal surfaces to connect the support 120, and therefore the cradle assembly 24, to the frame 14 of the truck 10 as described in greater detail below. The fittings 132 are welded to the flanges 128 and the cap 130, but it is contemplated that they could be connected otherwise, such as by threaded fasteners. As seen in FIG. 13, the ends of the support 120 taper down and are closed by end caps 134. The end caps 134 are made of carbon steel and are welded to the ends of the flanges 128 and the cap 130. It is contemplated that the end caps 134 could be made of another type of metal and could be connected to the rest of the support 130 by other means.

Once the band 122 has been wound around the cradle 118 and the tank body 26, the flanges 128 of the support 120 are welded (see welds 136, FIG. 15) to the outer surface of the cradle 118. As such, the support 120 extends in a generally lateral direction of the tank body 26. As can be seen in FIG. 15, the distance between the flanges 128 is slightly greater than a width of the band 122 so as to be located on either side of the band 122. As such, each flange 128 is disposed between the central portion of the cradle 118 and a corresponding one of the ends of the cradle 118 over which the band 124 or 126, as the case may be, is disposed. Although the bands 124 and 126 are preferably wound over the ends of the cradle 118 after the support 120 has been welded to the cradle 118, it is contemplated that the bands 124 and 126 could be wound before by providing as space sufficient to position and permit the welding of the flanges 128. Once the support 120 is welded to the cradle 118, the inner edges of the end caps 134 abut the outer surface of the band 122. As such, the portion of the band 122 located circumferentially between the end caps 134 is housed between the support 120 and the cradle 118 and is therefore protected from the environment.

Turning back to FIGS. 2 to 6, the structure used to connect the cradle assemblies 24 to the frame 14 of the truck 10 will be described. Two frame members, in the form of angle irons 138, are welded to the supports 120 of the cradle assemblies 24. One angle iron 138 is welded to the three 132 fittings on one side of the longitudinal centerline of the tank body 26 and the other angle iron 138 is welded to the three 132 fittings on the other side of the longitudinal centerline of the tank body 26. It is contemplated that the angle irons 138 could be fastened to the fittings 132. The angle irons 138 are then bolted to L-brackets 140 which are bolted or welded to longitudinal members 142 of the frame 14 of the truck 10. It is contemplated that the angle irons 138 could be welded to the L-brackets 140, however at least some connections between the cradle assemblies 24 and the frame 14 are preferably non-permanent (i.e. not welded) so as to permit removal of the transport tank 12 from the truck 10. Stoppers 144 are welded to the bottom of the angle irons 138. The stoppers 144 are positioned so as to be located on either side of the L-brackets 140 to help prevent longitudinal movement of the transport tank 12 relative to the frame 14 of the truck 10.

Figure 16:
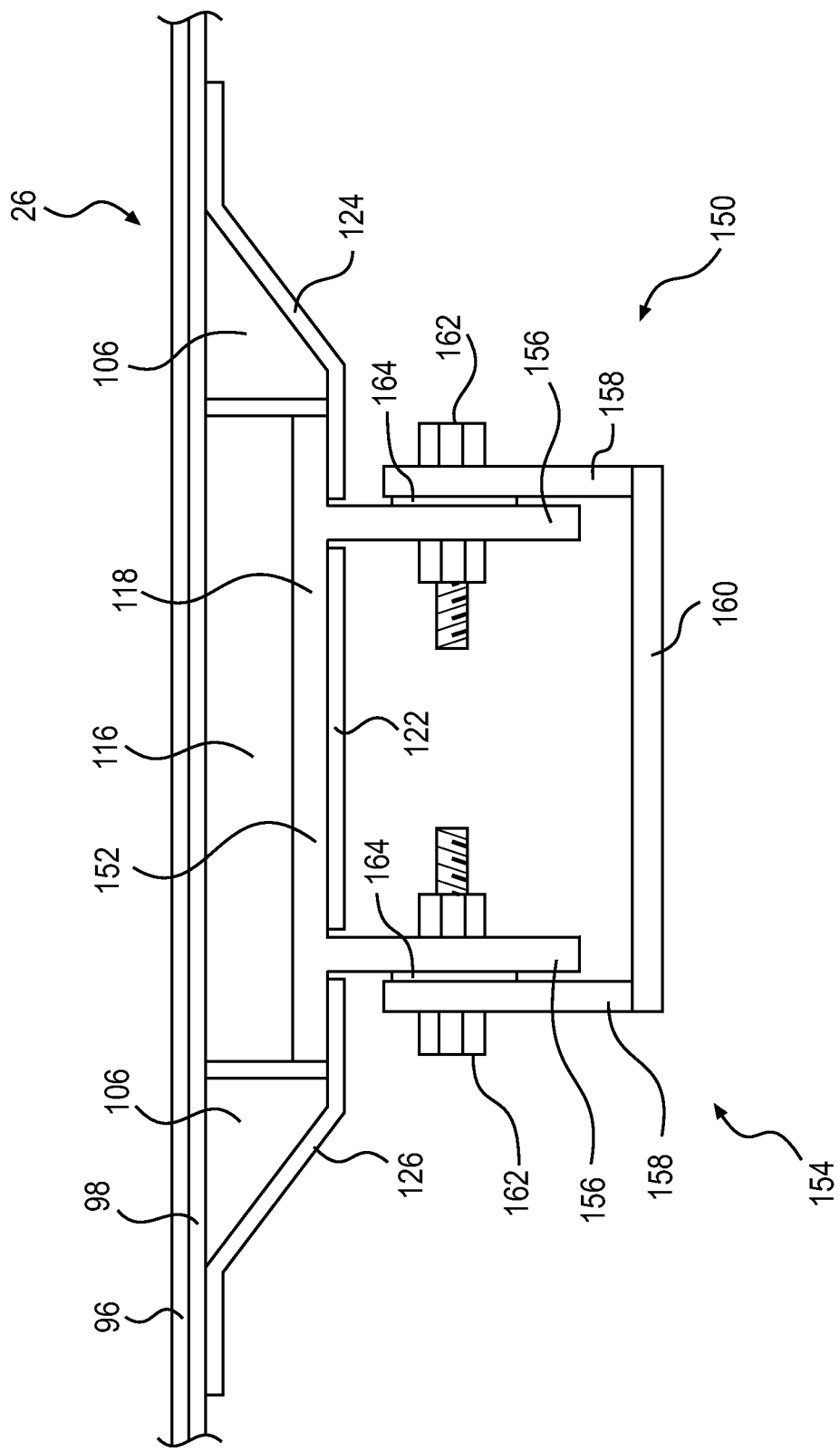
FIG. 16 is a schematic cross-sectional view of the transport tank of FIG. 4 and of an alternative embodiment of a cradle assembly taken along a longitudinal centerline of the transport tank.

Turning now to FIG. 16, a cradle assembly 150, which is an alternative embodiment of the cradle assembly 24 described above, will be described. For simplicity, elements of the cradle assembly 150 which are similar to those of the cradle assembly 24 have been labeled with the same reference numerals and will not be described again in detail.

Each cradle assembly 150 includes a strip 116, a cradle 152, and a support 154.

The strip 116 of the cradle assembly 150 is made of low shear modulus material like the strip 116 of the cradle assembly 24 and is bonded to the outer shell 98 of the tank body 26 between the tank bands 106 in the same manner.

The cradle 152 consists of a curved piece of carbon steel. It is contemplated that the cradle 152 could be made of another type of metal, such as aluminum. It is contemplated that the cradle 152 could also be made of composite material since, as will be described below, the present embodiment does not use welding to connect the cradle 152 to the support 154. The curvature of the cradle 152 corresponds to the curvature of the outer surface of the tank body 26 and has a radius of curvature corresponding to the radius of the tank body 26 plus the thickness of the strip 116 (plus adhesive). It is contemplated that in embodiments where the tank body 26 has a non-circular cross-section that the cradle 152 would have a profile corresponding to the profile of the outer surface of the tank body 26 where it is to be connected. The cradle 152 has a pair of flanges 156 extending therefrom away from the tank body 26. The flanges 156 have a plurality of apertures defined therein. It is contemplated that only one flange 156 could be provided.

The cradle 152 is bonded over an outer surface of the strip 116 like the cradle 118 of the cradle assembly 24. The cradle 152 is connected to the tank body 26 with three bands 122, 124 and 126 of carbon fiber and resin wound circumferentially over the outer side of the cradle 152 and the entire perimeter of the tank body 26 like the cradle 118 of the cradle assembly 24. As can be seen the band 122 is disposed between the flanges 156 and the bands 124, 126 are disposed outwardly of the flanges 156.

The support 154 is made of two parallel curved flanges 158 connected by a cap 160. In an embodiment where the cradle 152 only has one flange 156, the support 154 also has only one flange 158. The curvature of the flanges 158 corresponds to the curvature of the flanges 156 of the cradle 152. The flanges 158 have a plurality of apertures formed therein and arranged so as to be aligned with the apertures in the flanges 156 of the cradle 152. The support 154 also includes two laterally spaced apart fittings (not shown) similar to the fittings 132 of the cradle assembly 24. The fittings provide horizontal surfaces to connect the support 154, and therefore the cradle assembly 150, to the frame 14 of the truck 10 in a manner similar to the one described above for the cradle assembly 24. The flanges 158, cap 160, and fittings are made of carbon steel. It is contemplated that the flanges 158, cap 160, and fittings could be made of another type of metal such as aluminum. To connect the support 154 to the cradle 152, the apertures of the flanges 158 are aligned with the apertures of the flanges 156. Bolts 162 or other threaded fasteners are then inserted through the apertures and are used to connect the flanges 156, 158 together. Polymeric joints 164 are optionally disposed between the flanges 156 and the flanges 158. The cap 160 is then welded or otherwise connected to the flanges 158.

Turning now to FIGS. 17 to 20, a cradle assembly 170, which is an alternative embodiment of the cradle assembly 24 described above, will be described. For simplicity, elements of the cradle assembly 170 which are similar to those of the cradle assembly 24 have been labeled with the same reference numerals and will not be described again in detail.

Figure 17:
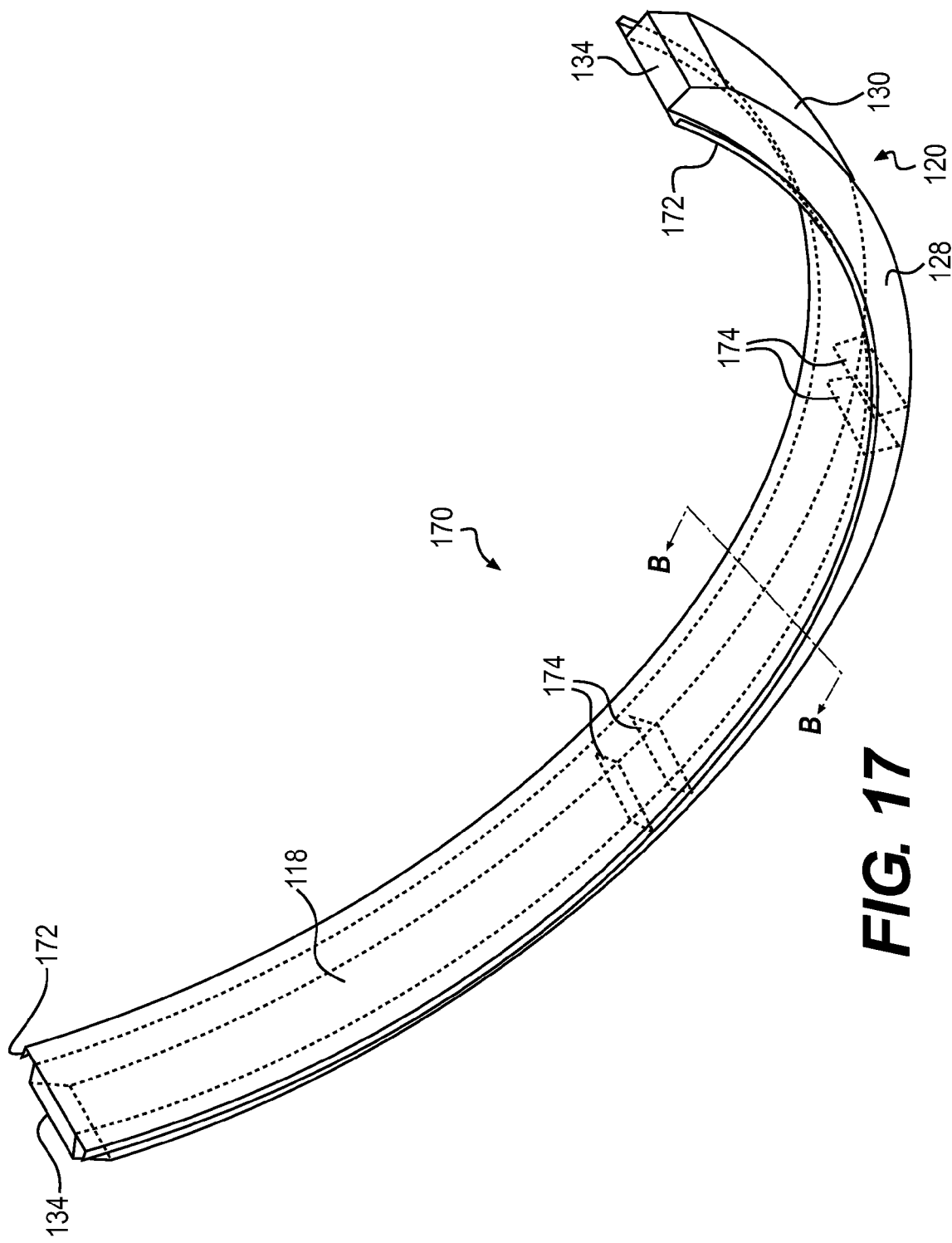
FIG. 17 is a perspective view of another alternative embodiment of a cradle assembly of the transport tank of FIG. 4 with portions shown in phantom.
Figure 18:
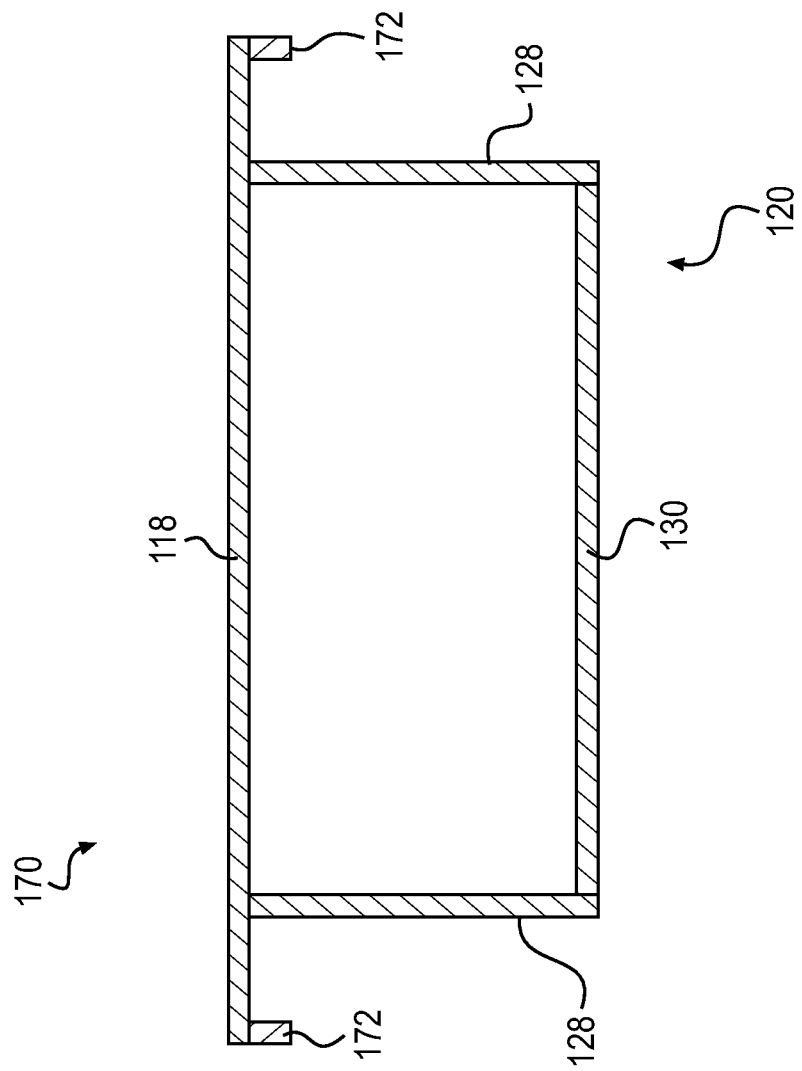
FIG. 18 is a cross-sectional view of the cradle assembly of FIG. 17 taken through line B-B of FIG. 17.

The cradle assembly 170 has the same elements as the cradle assembly 24 with the addition of two lips 172. As best seen in FIG. 18, the lips 172 are connected the front and back ends of the cradle 118 and are generally parallel to the flanges 128. In the present embodiment, the lips 172 are welded to the cradle 118. It is contemplated that the lips 172 could be integrally formed with the cradle 118 or could be otherwise connected to the cradle 118. As seen in FIG. 17, the curvature of the lips 172 corresponds to the curvature of the outer surface of the cradle 118 and span an entire length of the cradle 118. It is contemplated that the lips 172 could span less than an entire length of the cradle 118. It is also contemplated that the lips 172 could be made of a plurality of spaced apart lip segments disposed along the length, or a portion of the length, of the cradle 118.

Figure 19:
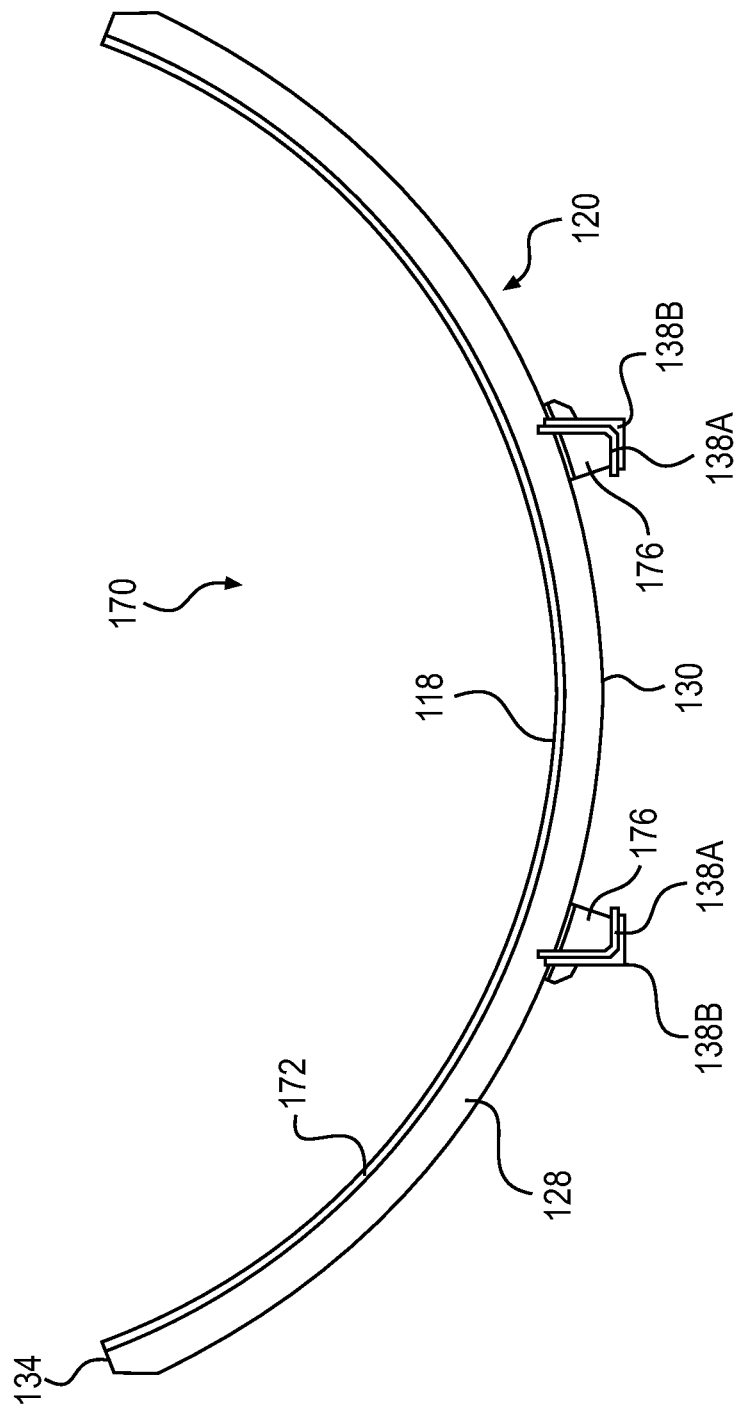
FIG. 19 is a front elevation view of the cradle assembly of FIG. 17 supported on a portion of a frame of the truck of FIG. 1.

As seen in FIG. 17, the cradle assembly 170 also has a four reinforcing plates 174 disposed inside and welded to the perimeter defined by the cradle 118, the curved flanges 128 and the cap 130. The reinforcing plates 174 are located in the portions of the cradle assembly 170 that rest on cradle support feet 176 (FIG. 19) used to connect the cradle assembly 170 to the frame 14 of the truck 10. As can be seen in FIG. 19, in this embodiment, each angle iron 138 has been replaced with two overlapping angle irons 138A, 138B. However it is contemplated that only one angle iron 138 could be used instead of the two angle irons 138A, 138B. It is contemplated that the reinforcing plates 174 and the support feet 176 could be replaced with the two laterally spaced apart fittings 132 of the cradle assembly 24.

Figure 20:
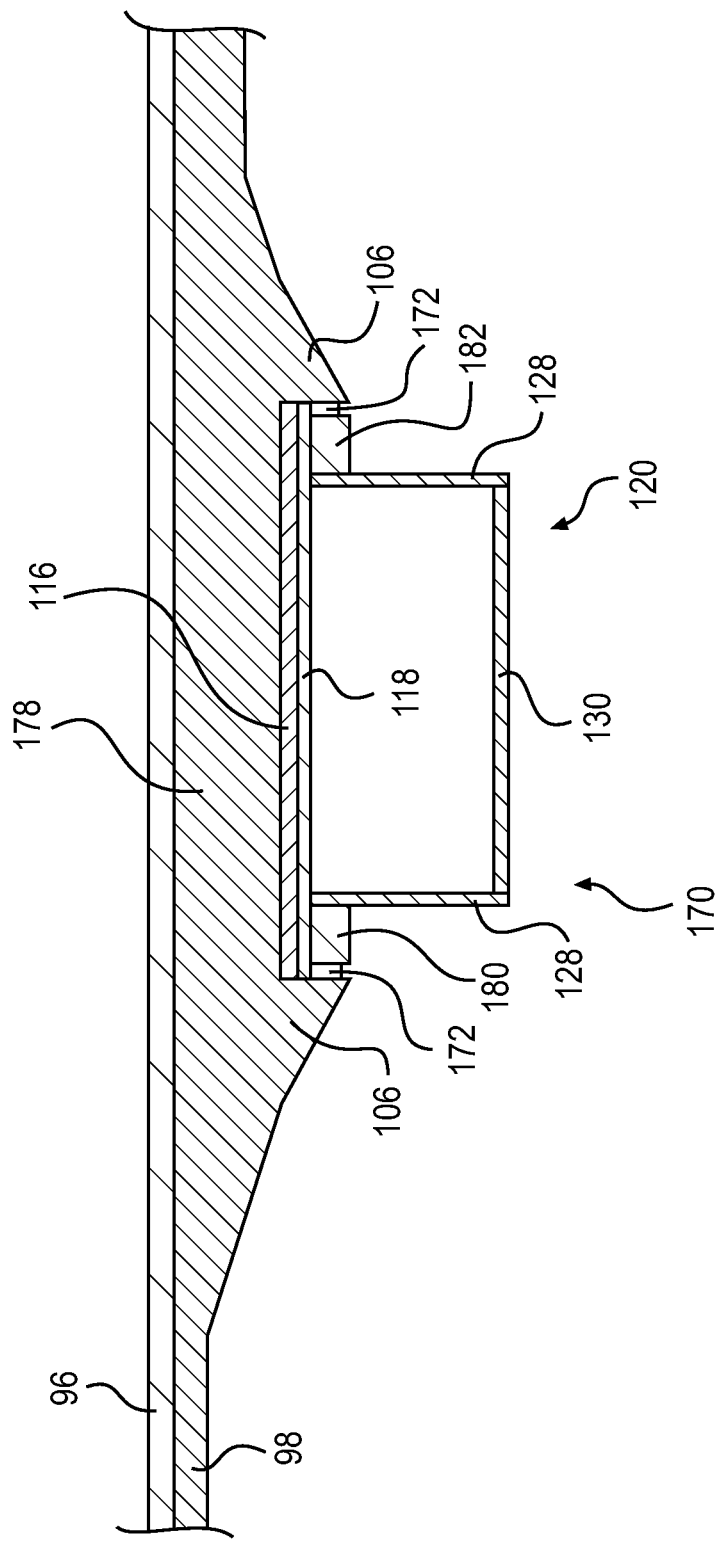
FIG. 20 is a cross-sectional view of the transport tank of FIG. 4 and of the cradle assembly of FIG. 17 taken along a longitudinal centerline of the transport tank.
Figure 21:
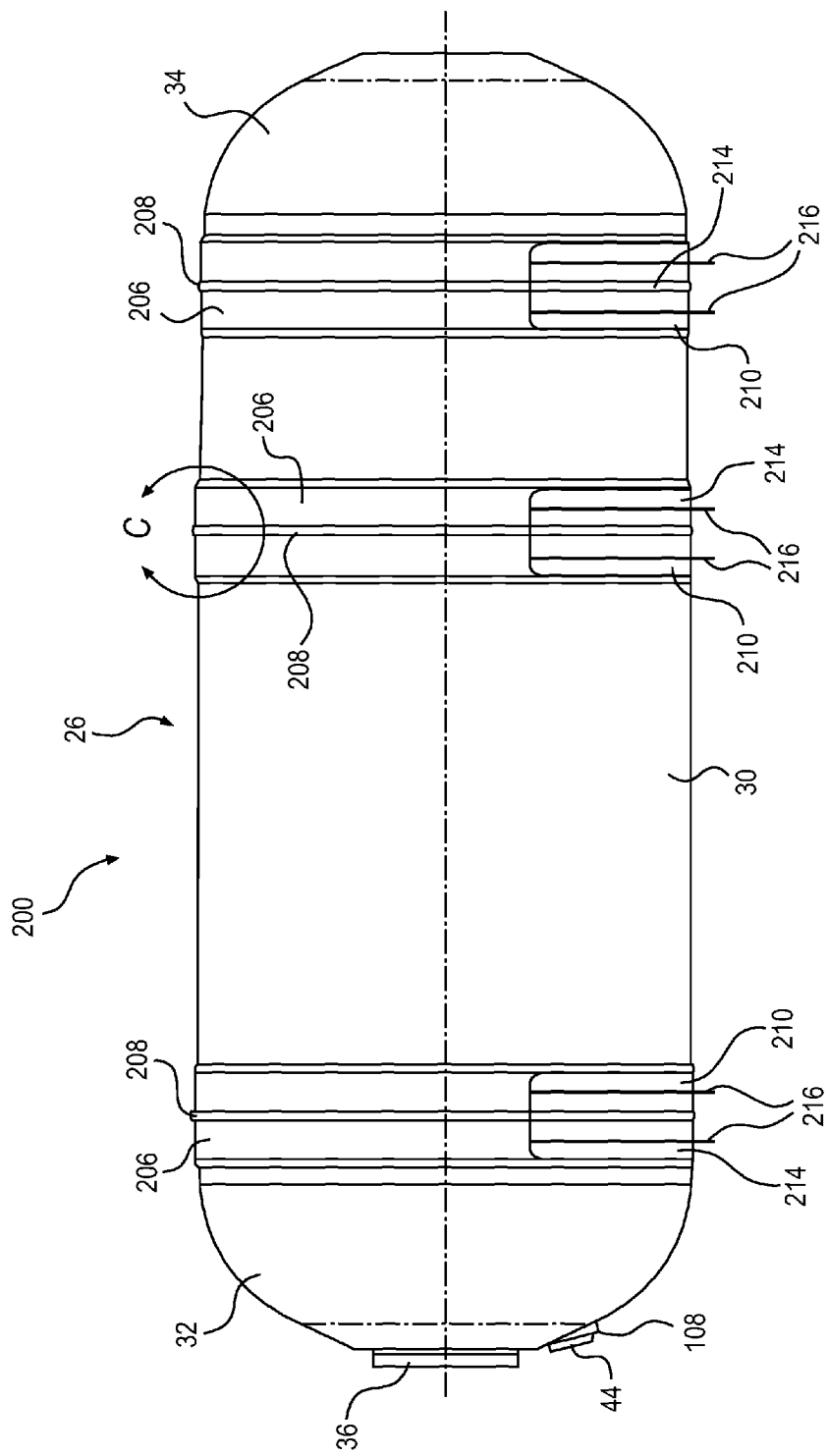
FIG. 21 is a right side elevation view of an alternative embodiment of the transport tank of FIG. 4 with an alternative embodiment of cradles mounted thereto.

In the present embodiment, each pair of tank bands 106 is formed by laying a large band of carbon fiber and resin for each pair of tank bands 106 prior to curing and, once cured, by machining each large band to form a pair of tank bands 106. As can be seen in FIG. 20, the section of carbon fiber and resin located between the tank bands 106 is not machined all the way to the outer shell 98. As such, a band 178 of carbon fiber and resin is located between the strip 116 and the outer shell 98. It is contemplated that the tank bands 106 could be formed as described above with respect to the cradle assembly 24, in which case the strip would be connected to the outer shell 98. The strip 116 of the cradle assembly 170 is made of low shear modulus material like the strip 116 of the cradle assembly 24 and is bonded to the band 178 between the tank bands 106 in a manner similar to that used to bond the strip 116 of the cradle assembly 24 to the outer shell 98.

To connect the cradle 118 with the lips 172 to the tank body 26, the cradle 118 is bonded over an outer surface of the strip 116 in a manner similar to the one used to bond the cradle 118 of the cradle assembly 24 to its corresponding strip 116. Additionally, two bands 180 and 182 of carbon fiber and resin are wound circumferentially over the outer side of the cradle 118 and the entire perimeter of the tank body 26. It is contemplated that one or both of the bands 180 and 182 could be wound around only a portion of the perimeter of the tank body 26. In such an embodiment, one or both of the bands 180 and 182, as the case may be, are longer than the cradle 118 so as to cover the entire length of the cradle 118 and extend beyond the cradle 118 to attach to the outer surface of the tank body 26. It is contemplated that the bands 180 and 182 could also be made of another type of composite material. As seen in FIG. 20, the band 180 is disposed between one lip 172 and one flange 128. Similarly, the band 182 is disposed between the other lip 172 and the other flange 128. It is contemplated that one of the bands 180 and 182 could be omitted. Since no band of composite material is wound over the portion of the cradle 118 located between the flanges 128, the flanges 128, the cap 130, the reinforcing plates 174 and the end caps 134 can all be connected to the cradle 118 prior to connecting the cradle 118 to the tank body 26. It is contemplated that a band composite material could be wound over the portion of the cradle 118 located between the flanges 128, in which case the flanges 128, the cap 130, the reinforcing plates 174 and the end caps 134 would be connected to the cradle 118 after connecting the cradle 118 to the tank body 26. It is contemplated that one or both of the bands 180 and 182 could be omitted when a band composite material is wound over the portion of the cradle 118 located between the flanges 128. It is also contemplated that only one lip 172 could be provided, in which case the band 180 or 182 corresponding to the side of the cradle 118 where the lip has been removed would be replaced by a band of composite material similar to the bands 124 and 126 described above with respect to the cradle assembly 24.

Turning now to FIGS. 21 to 31, an alternative embodiment of a transport tank 200 and of a cradle assembly 202 will be described. For simplicity, elements of the transport tank 200 which are similar to those of the transport tank 12 described above have been labeled with the same reference numerals and will not be described again in detail.

Figure 22:
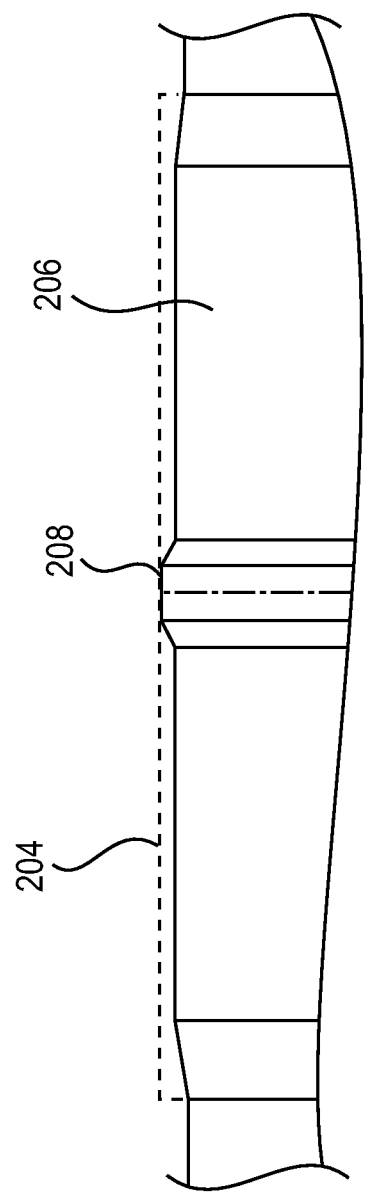
FIG. 22 is a close-up view of the transport tank of FIG. 21 identified by line C in FIG. 21.

The tank body 26 of the tank 200 is not provided with the tank bands 106 of the tank 12. In the tank body 26 of the tank 200, three bands 204 of carbon fiber and resin (one shown in phantom in FIG. 22), or other composite material, are wound circumferentially around the outer shell 98 prior to curing the tank body 26. Once the tank body 26 has been cured, the bands 204 are machined to form circumferential bosses 206 and protrusions 208 extending outwardly from the tank body 26. As best seen in FIG. 22, the bosses 206 and protrusions 208 are machined to be generally planar with beveled edges, however it is contemplated that they could have other geometries. It is contemplated that bosses 206 could be omitted and that only the protrusions 208 could be formed. It is also contemplated that bosses 206 and protrusions 208 could be formed otherwise such as by bonding them to the tank body 26 after curing. It is also contemplated that the bosses 206 and protrusions 208 could only span a portion of a lower portion of a perimeter of the tank body 26 where the cradle assemblies 202 are to be mounted.

The transport tank 200 has three cradle assemblies 202. It is contemplated that more or less than three cradle assemblies 202 could be provided. Each cradle assembly 202 includes a cradle 210 and a support 212. For simplicity, only one of the cradle assemblies 202 will be described. It should be understood that the other cradle assemblies 202 are the same. It is contemplated each cradle assembly 202 could be different in order to accommodate for variations in the profile of the tank body 26 depending on their locations or to avoid interference with other components of the truck 10 for example.

Figure 27:
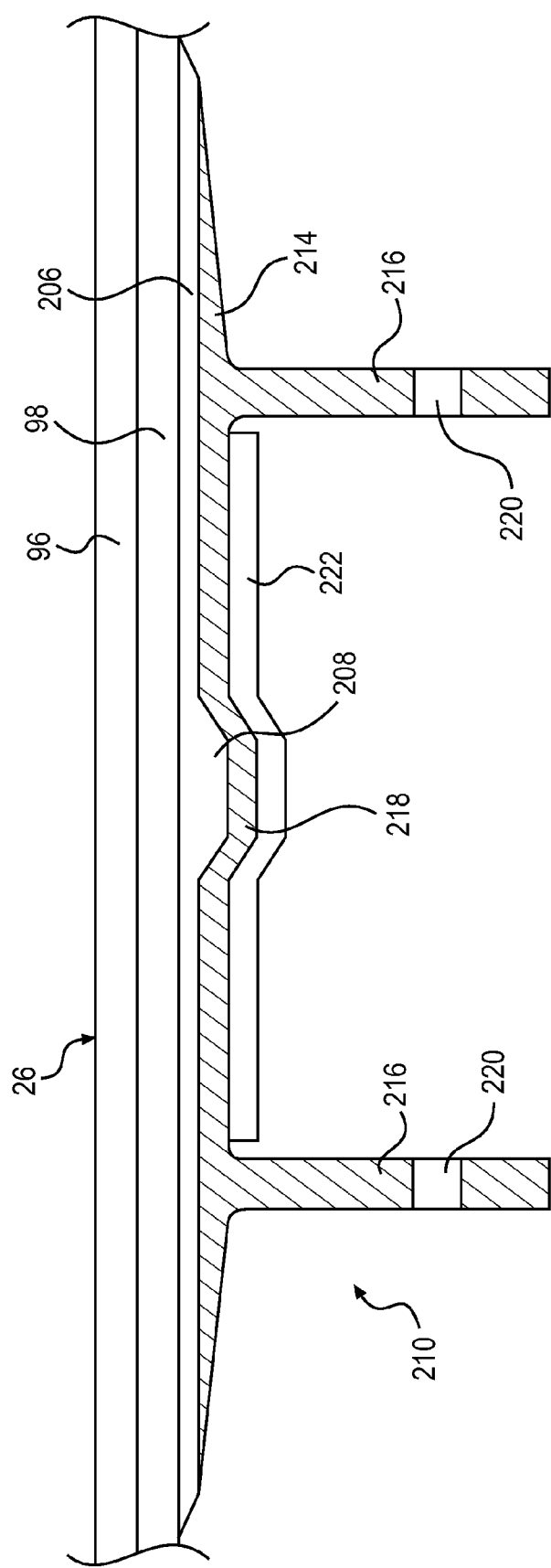
FIG. 27 is a schematic cross-sectional view of the transport tank of FIG. 21 and of one of the cradles of FIG. 21 taken along a longitudinal centerline of the transport tank of FIG. 21.

The cradle 210, shown in FIGS. 23 to 25, consists of a curved piece of carbon fiber and resin composite material having an inner part 214 and two flanges 216. It is contemplated that the cradle 210 could be made of another type of composite material or of another type of material such as metal. The curvature of the cradle 210 corresponds to the curvature of the bosses 206. It is contemplated that in embodiments where the tank body 26 has a non-circular cross-section that the cradle 210 would have a profile corresponding to the profile of the outer surface of the tank body 26 where it is to be connected. The inner part 214 has a concavity 218 defined therein. As seen in FIG. 27, the profile of the concavity 218 is complementary to a profile of the corresponding protrusion 208. It is contemplated that the concavity 218 could have a profile which is different from the profile of the corresponding protrusion 208 as long as the concavity 218 can receive the protrusion 208 therein. The flanges 216 have a plurality of apertures 220 defined therein. It is contemplated that the cradle 210 could be provided with only one flange 216.

The cradle 210 is bonded over an outer surface of a lower portion of a corresponding boss 206 and protrusion 208 such that the protrusion 208 is received in the concavity 218. As such, the cradle 210 extends in a generally lateral direction of the tank body 26.

Figure 26:
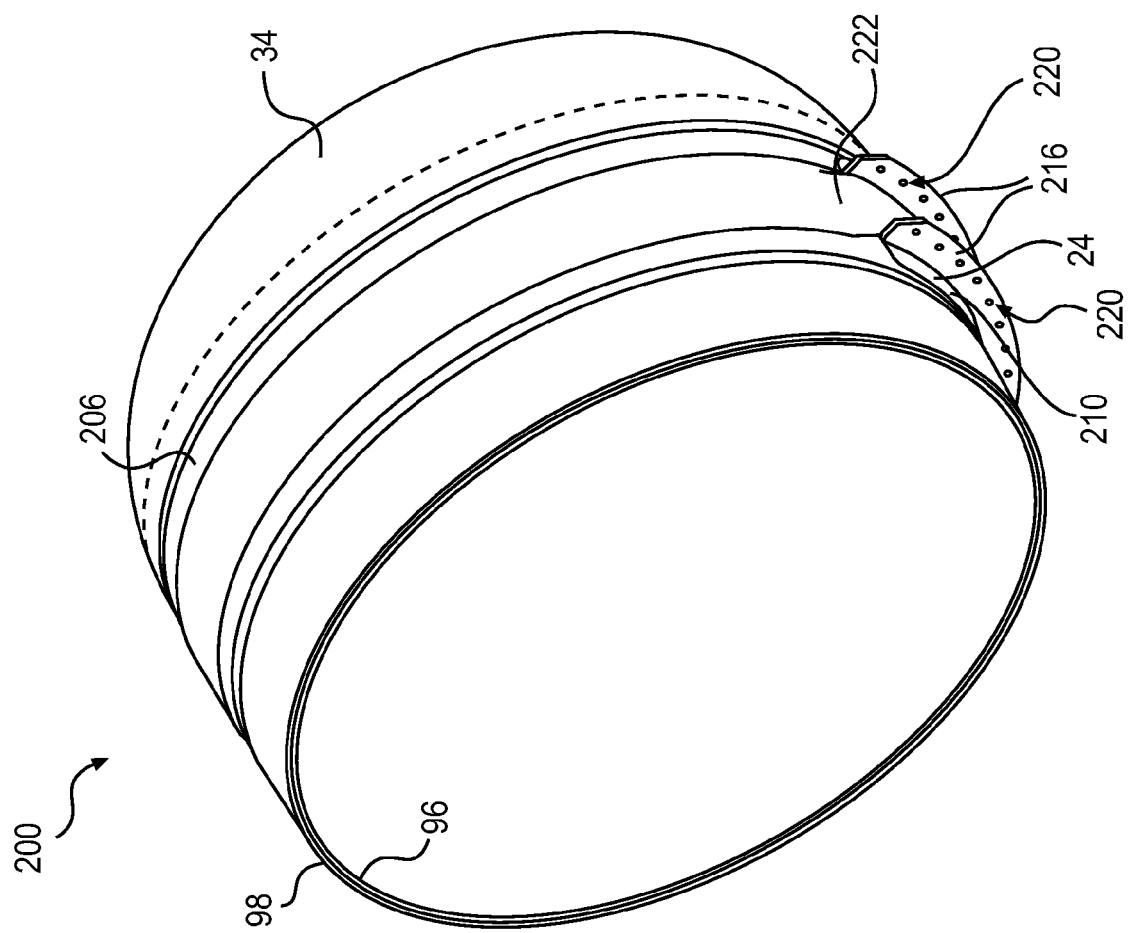
FIG. 26 is a perspective view taken from a rear, right side of a forward portion of the transport tank of FIG. 21 with a cradle mounted thereto.

As seen in FIG. 26, a band 222 of carbon fiber and resin is then wound circumferentially over the outer side of the cradle 210 and the entire perimeter of the tank body 26. More specifically, the band 222 is wound over the inner part 214 of the cradle 210 between the flanges 216 and over the boss 206 and protrusion 208. It is contemplated that the band 222 could be wound around only a portion of the perimeter of the tank body 26. In such an embodiment, the band 222 is longer than the cradle 210 so as to cover the entire length of the cradle 210 and extend beyond the cradle 210 to attach to the outer surface of the tank body 26. It is contemplated that the band 222 could also be made of another type of composite material. It is contemplated that additional bands of composite materials could be wound over the portions of the inner part 214 of the cradle extending outwardly of the flanges 216.

Figure 30:
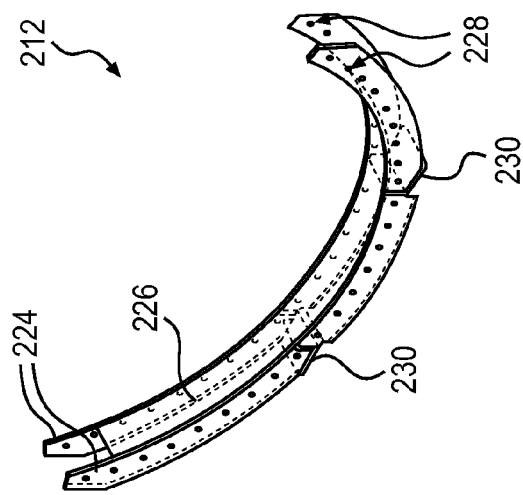
FIG. 30 is a perspective view of the support of FIG. 28 with portions shown in phantom.
Figure 29:
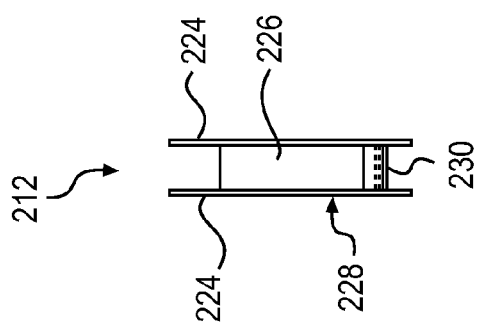
FIG. 29 is a side view of the support of FIG. 28.
Figure 28:
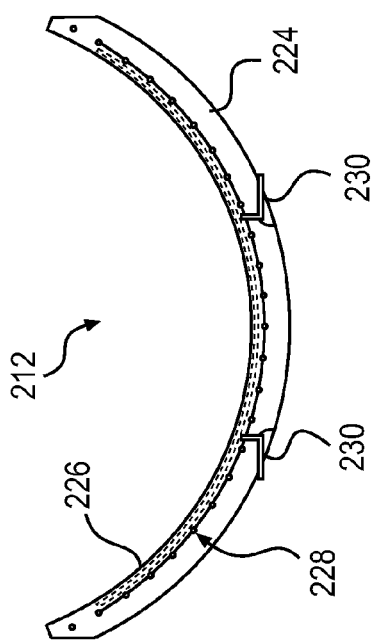
FIG. 28 is an end view of a support for the cradles of FIG. 21.

The support 212, shown in FIGS. 28 to 30, is made of two parallel curved flanges 224 connected by a curved inner part 226. The flanges 224 and the curved inner part 226 can be integrally formed or otherwise connected together, by welding for example. The curvature of the flanges 224 corresponds to the curvature of the flanges 216 of the cradle 210. The flanges 224 have a plurality of apertures 228 formed therein and arranged so as to be aligned with the apertures 220 in the flanges 216 of the cradle 210. The support 212 also includes two laterally spaced apart fittings 230 disposed between and connected to the flanges 224. The flanges 224, curved inner part 226, and fittings 230 are made of carbon steel. It is contemplated that the flanges 224, curved inner part 226, and fittings 230 could be made of another type of metal such as aluminum. The fittings 230 provide horizontal surfaces to connect the support 212, and therefore the cradle assembly 202, to the frame 14 of the truck 10 in a manner similar to the one described above with respect to the cradle assemblies 24. The fittings 230 are welded to the flanges 224 and the curved inner part 226, but it is contemplated that they could be connected otherwise, such as by threaded fasteners.

Figure 31:
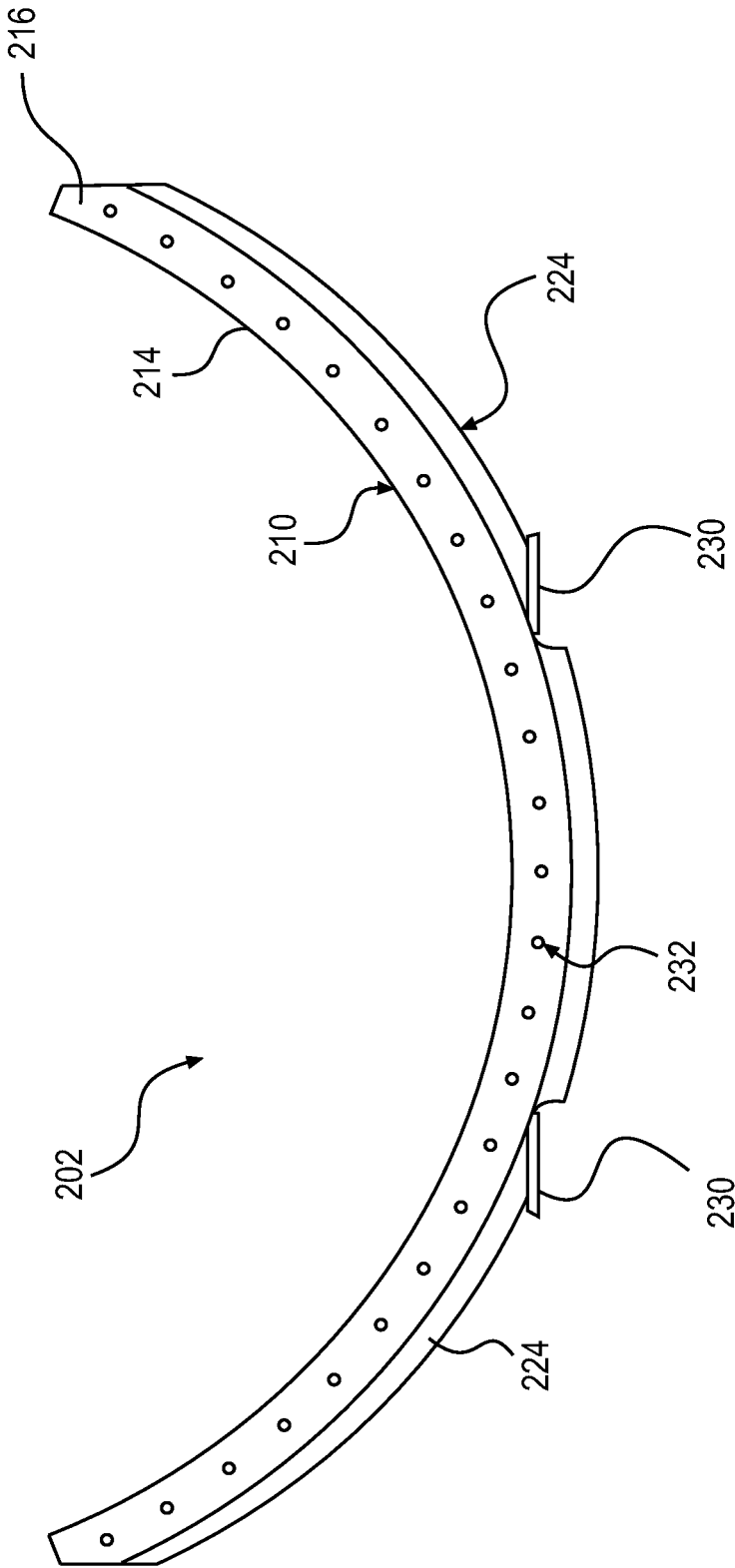
FIG. 31 is an end view of the cradle of FIG. 23 connected to the support of FIG. 28.

Once the band 222 has been wound around the cradle 210 and the tank body 26, the support 212 is inserted between the flanges 216 of the cradle 210 such that the aperture 228 and 220 are aligned. The cradle 210 is then fastened to the support 212 using a plurality of threaded fasteners 232 inserted through the apertures 228 and 220, as seen in FIG. 31. As such, the support 212 extends in a generally lateral direction of the tank body 26.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A transport tank assembly for mounting to a truck comprising:
 a composite tank body having an inner side and an outer side; and
 at least one cradle assembly connected to the outer side of the tank body, each cradle assembly comprising:
  a strip of low shear modulus material bonded to the outer side of the tank body, the strip spanning at least a portion of a lower portion of a perimeter of the tank body, the low shear modulus material having a shear modulus of less than 10 ksi;
  a cradle having an inner side and an outer side, the inner side of the cradle being bonded to the strip, the strip being disposed between the cradle and the outer side of the tank body; and
  at least one band of composite material disposed over the outer side of the cradle and at least a portion of the outer side of the tank, a length of the band of composite material being greater than a length of the cradle, the band of composite material connecting the cradle to the tank body,
 the strip, the cradle, and the at least one band extending in a generally lateral direction of the tank body.

2. The transport tank assembly of claim 1, wherein the low shear modulus material has a shear modulus of less than 5 ksi.

3. The transport tank assembly of claim 2, wherein the low shear modulus material has a shear modulus of less than 2 ksi.

4. The transport tank assembly of claim 3, wherein the low shear modulus material has a shear modulus of about 0.6 ksi.

5. The transport tank assembly of claim 1, wherein each cradle assembly further comprises at least one flange connected to the outer side of the cradle, the at least one flange extending in a generally lateral direction of the tank body.

6. The transport tanks assembly of claim 5, wherein each cradle assembly further comprises at least one lip connected to the outer side of the cradle, the at least one lip being generally parallel to the at least one flange; and
 wherein the at least one band of composite material is disposed between the at least one lip and the at least one flange.

7. The transport tank assembly of claim 5, wherein the at least one flange is two spaced apart and generally parallel flanges.

8. The transport tank assembly of claim 7, wherein the at least one band of composite material is disposed between the two flanges.

9. The transport tank assembly of claim 7, wherein each cradle assembly further comprises a cap connected to the two flanges, 10. The transport tank assembly of claim 7, wherein the cradle has a central portion disposed between the two flanges and two end portions disposed outwardly of the two flanges; and
 wherein the at least one band of composite material is two bands of composite materials, each one of the two bands being disposed over a corresponding one of the two end portions of the cradle.

11. The transport tank assembly of claim 10, wherein for each cradle assembly the tank assembly further comprises a pair of tank bands connected to the outer side of the tank body on either side of the strip and in proximity to the strip.

12. The transport tank assembly of claim 11, wherein for each cradle assembly each one of the two bands of composite material is disposed over a corresponding one of the pair of tank bands.

13. The transport tank assembly of claim 7, wherein the cradle has a central portion disposed between the two flanges and two end portions disposed outwardly of the two flanges; and
 wherein the at least one band of composite material is three bands of composite materials, a first one of the three bands being disposed over a one of the two end portions of the cradle, a second one of the three bands being disposed over the central portion of the cradle, and a third one of the three bands being disposed over a remaining one of the two end portions of the cradle.

14. The transport tank assembly of claim 1, wherein for each cradle assembly the tank assembly further comprises a pair of tank bands connected to the outer side of the tank body on either side of the strip and in proximity to the strip.

15. The transport tank assembly of claim 14, wherein for each cradle assembly the at least one band of composite material is disposed over the pair of tank bands.

16. The transport tank assembly of claim 1, wherein the at least one band of composite material spans the entire perimeter of the tank body.

17. The transport tank assembly of claim 16, wherein the at least one cradle assembly is at least two cradle assemblies; and the transport tank further comprises a frame member connected to the at least two cradle assemblies.

18. The transport tank assembly of claim 16, wherein the low shear modulus material is an elastomeric material.

19. The transport tank assembly of claim 18, wherein the elastomeric material is silicone rubber.

20. The transport tank assembly of claim 1, wherein the at least one cradle assembly is at least two cradle assemblies; and the transport tank further comprises a frame member connected to the at least two cradle assemblies.

21. The transport tank assembly of claim 20, wherein the low shear modulus material is an elastomeric material.

22. The transport tank assembly of claim 21, wherein the elastomeric material is silicone rubber.

23. The transport tank assembly of claim 1, wherein the low shear modulus material is an elastomeric material.

24. The transport tank assembly of claim 23, wherein the elastomeric material is silicone rubber.

25. A transport tank assembly for mounting to a truck comprising:

a composite tank body having an inner side and an outer side; and at least one cradle assembly connected to the outer side of the tank body, for each cradle assembly, the tank body having a protrusion extending from the outer side of the tank body, the protrusion spanning at least a portion of a lower portion of a perimeter of the tank body, each cradle assembly comprising:

a cradle having an inner side and an outer side, the inner side of the cradle being bonded to the outer side of the tank body, the cradle having a concavity receiving the protrusion therein; and at least one band of composite material disposed over the outer side of the cradle and at least a portion of the outer side of the tank, a length of the band of composite material being greater than a length of the cradle, the band of composite material connecting the cradle to the tank body, the cradle and the at least one band extending in a generally lateral direction of the tank body.

26. The transport tank assembly of claim 25, wherein each cradle assembly further comprises at least one flange connected to the outer side of the cradle, the at least one flange extending in a generally lateral direction of the tank body.

27. The transport tank assembly of claim 26, wherein the at least one flange is two spaced apart and generally parallel flanges.

28. The transport tank assembly of claim 27, wherein the cradle and the two flanges are made of composite material.

29. The transport tank assembly of claim 27, wherein the at least one band of composite material is disposed between the two flanges.

30. The transport tank assembly of claim 29, wherein each cradle assembly further comprises a support disposed between the flanges and fastened to the flanges; and wherein the at least one band of composite material is disposed between the cradle and the support.

31. The transport tank assembly of claim 30, wherein the at least one cradle assembly is at least two cradle assemblies; and the transport tank further comprises at least one frame member connected to the supports of the at least two cradle assemblies.

32. The transport tank assembly of claim 25, wherein the at least one band of composite material spans the entire perimeter of the tank body.

33. The transport tank assembly of claim 32, wherein each protrusion spans the entire perimeter of the tank body.

34. The transport tank assembly of claim 32, wherein a profile of the protrusion is complementary to a profile of the concavity.

35. The transport tank assembly of claim 25, wherein each protrusion spans the entire perimeter of the tank body.

36. The transport tank assembly of claim 35, wherein a profile of the protrusion is complementary to a profile of the concavity.

37. The transport tank assembly of claim 25, wherein a profile of the protrusion is complementary to a profile of the concavity.

* * * * *